(12) United States Patent
Iwatsuki et al.

(10) Patent No.: US 6,304,916 B1
(45) Date of Patent: Oct. 16, 2001

(54) LAN CONNECTION APPARATUS AND METHOD THEREOF

(75) Inventors: Kazuko Iwatsuki, Kawasaki; Hiroyuki Wada, Hadano, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/350,108

(22) Filed: Jul. 9, 1999

Related U.S. Application Data

(63) Continuation of application No. 08/975,047, filed on Nov. 20, 1997, now Pat. No. 5,953,508, which is a continuation of application No. 08/397,369, filed on Mar. 2, 1995, now Pat. No. 5,724,507.

(30) Foreign Application Priority Data

Mar. 2, 1994 (JP) .................................................. 6-032469
Nov. 14, 1994 (JP) .................................................. 6-279344

(51) Int. Cl.⁷ .................................................. G06F 13/00
(52) U.S. Cl. .................................................. 709/250
(58) Field of Search .................................. 709/201, 224, 709/236, 237, 249, 250

(56) References Cited

U.S. PATENT DOCUMENTS

| | | | |
|---|---|---|---|
| 4,637,013 | 1/1987 | Nakamura | 370/221 |
| 4,787,083 | 11/1988 | Tanaka | 370/431 |
| 4,933,937 | 6/1990 | Konishi | 370/404 |
| 5,058,109 | 10/1991 | Goldberg et al. | 370/401 |
| 5,299,193 | 3/1994 | Szczepanek | 370/463 |
| 5,404,536 | 4/1995 | Ramarkrishnan et al. | 710/220 |
| 5,440,690 | 8/1995 | Rege et al. | 709/250 |
| 5,479,613 | 12/1995 | Geyer et al. | 709/224 |
| 5,481,540 | 1/1996 | Huang | 370/401 |
| 5,497,374 | 3/1996 | Maruyama et al. | 370/450 |
| 5,513,321 | 4/1996 | Katori | 709/234 |
| 5,724,507 | * 3/1998 | Iwatsuki et al. | 709/250 |

OTHER PUBLICATIONS

Draft Standard–Information Technology, Local and Metropolitan Networks Part 12: Demand Priority Access Method and Physical Layer Specifications.

* cited by examiner

*Primary Examiner*—Moustafa M. Meky
(74) *Attorney, Agent, or Firm*—Antonelli, Terry, Stotu & Kraus, LLP

(57) ABSTRACT

An end node for which sending and receiving are controlled by a hub is directly connected and used. When another end node is directly connected to the PMD control unit 2, the input control signal processor 11 of the signal processor 1 receives a receiving state signal indicating the state of a tone signal which is outputted from the PMD control unit 2 and received from another end node, converts it to a receiving state signal indicating the state of a tone signal from the hub which has the same meaning as it, and transfers it to the MAC/PMI control unit 4.

18 Claims, 23 Drawing Sheets

(1) IDLE STATE → TRANSFER REQUEST AND PERMISSION OF SENDING FROM A HUB(SILENCE) → START THE PACKET SENDING (2) WHEN SENDING REQUESTS FROM A HUB AND FROM AN END NODE CONFLICTS, THE HUB WORKS PREFERENTIALLY

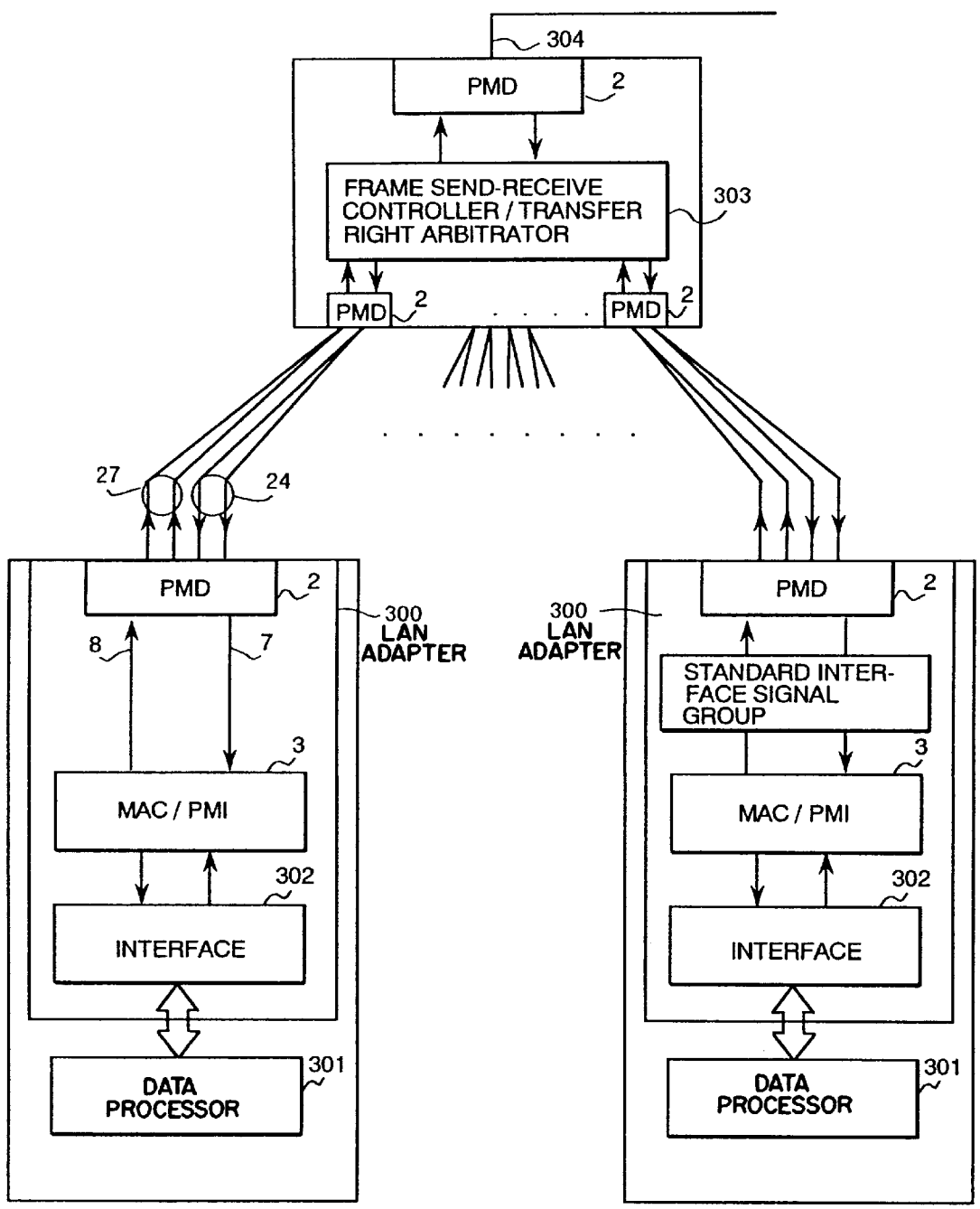

LAN CONNECTION APPARATUS AND METHOD THEREOF

This is a continuation of application Ser. No. 08/975,047 filed Nov. 20, 1997, now U.S. Pat. No. 5,953,508; which is a continuation of Ser. No. 08/397,369 filed Mar. 2, 1995, now U.S. Pat. No. 5,724,507.

BACKGROUND OF THE INVENTION AND RELATED ART

Use of a star type LAN for connecting a plurality of end nodes to a line concentrator which is called a hub is now widespread. In this type of LAN, the hub is connected to each end node with stranded paired cables and modular jacks.

For example, 10 Base-T which is described in the proposal of IEEE802.3 may be cited as such a LAN.

Recently in this star type LAN, developments for allowing the central line concentrator (hub) to control sending and receiving of a frame from downstream node and to arbitrate the transfer right thereof have materialized.

For example, in a system which is called a demand priority system in IEEE802.12, a medium access control (MAC) protocol provides that the hub arbitrates a frame transfer request from each downstream node which is connected to an intermediate hub, selects a downstream node, and gives permission for sending the frame.

This demand priority system will be explained hereunder. FIG. 19 shows a configuration example of a LAN to which the demand priority system is applied. In the drawing, numerals 200 to 207 indicate end nodes and 211, 212, and 213 indicate hubs. When an inter-network connection device such as a bridge is used so as to connect another network, the inter-network connection device is connected to the hub as an end node. In the drawing, 207 indicates an inter-network connection device. The hubs and end nodes are nodes of the LAN. In FIG. 19, those indicated on the upper part are upper-stream nodes.

In this LAN, a network can be configured by connecting a plurality of hubs hierarchically. 4-pair stranded cables are used for connection between the hubs and between the hubs and end nodes, that is, between the nodes.

Each of the hubs 211 and 213 has a plurality of downstream ports and an upstream port. The end nodes or the downstream hubs 211 and 213 are connected to the respective downstream ports of the upstream hub 212, and are regarded as downstream nodes of hub 212. The upstream hub 212 is connected to the upstream ports of the downstream hubs 211 and 213 and is regarded as an upstream node thereof. The uppermost stream hub 212 is called a root hub.

In each hub, the downstream ports to which the nodes which are required to transfer all the frames, such as the hubs and inter-network connection device, are connected, are set in the promise cure mode beforehand and the other ports are set in the privacy mode. To each port in the privacy mode, the address which is given to the node (end node) connected to the port corresponds. The promise cure mode is a mode for sending data to all of the nodes connected in the LAN and the privacy mode is a mode for specifying the node address and sending data only to the node which is defined by the specified address.

The frame transfer operation from the end node 200 will be explained hereunder with reference to FIG. 20.

The session for arbitrating the frame transfer right between the hub 211 and the end node 200 is executed by each using 2 pairs of the 4-pair cable for output and by alternately sending and receiving a control signal which is decided by a combination of 2 signal states on the 2-pair cable to be used for output as shown in Table 1. The same may be said with the hub 211 and the end node 201, 202, or others.

TABLE 1

| <End node -> hub> | | | <Hub -> end node> | | |
|---|---|---|---|---|---|
| Item | TP1 | TP2 | Item | TP3 | TP4 |
| Receivable (Silence) | 0 | 0 | Permission of sending (Silence) | 0 | 0 |
| Idle | 1 | 1 | Idle | 1 | 1 |
| Transfer request NP | 1 | 2 | Request for preparation of receiving (Incoming) | 1 | 2 |
| Transfer request HP | 2 | 1 | Reserve | (2 | 1) |
| Training request (for connection check) | 2 | 2 | Training Idle (for connection check) | 2 | 2 |

0: Silence
1: Tone1 (938 kHz)
2: Tone2 (1.875 MHz)
NP: Normal Priority
HP: High Priority In the table, a symbol TP indicates a pair number of the stranded cable. As a signal state, three states such as the 938 kHz tone signal output state, 1.875 MHz signal output state, and silent state are used. The transfer request NP generally indicates a priority transfer request and the sending request HP indicates a top priority transfer request.

In the initial state, the hubs 211, 212, and 213 and the end nodes 200 to 207 which are connected to them output a control signal IDLE.

A case that a transfer request occurs in the end nodes 200 and 202 will be considered. Specifically, it is assumed that the end node 200 sends the transfer request HP and the end node 202 sends the transfer request NP to the hub 211. The hub 211 which recognizes it sends the control signal and the transfer request NP or the control signal and the sending request HP to the upstream hub 212 from the upstream port. When the hub 211 receives Silence from the upstream hub 212, it arbitrates the transfer right, selects the end node 200 for giving transfer permission so that the sending request HP works preferentially to the transfer request NP, and transmits Silence to the end node 200. The hub 211 sends the control signal and request for preparation of receiving (Incoming) to the other end nodes 201, 202, and 203.

The end nodes 201, 202, and 203 which receive the control signal and request for preparation of receiving from the hub 211, as shown in FIG. 20(2), always put the states of the self nodes into the Silence state immediately regardless of whether or not the respective nodes send a transfer request, and transmit Silence to the hub 211.

On the other hand, the end node 200 to which Silence is transmitted from the hub 211 recognizes permission of transfer and starts frame transfer to the hub 211 using all of the 4-pair wires. Since non-output is used as Silence in this protocol, no collision is generated during frame transfer.

The hub 211 which receives this frame sends the frame to the upstream hub 212 and checks the destination address of the inputted frame. When the end node which is the destination of this frame is connected, the hub 211 sends the frame to this end node using all of the 4-pair wires; The hub 211 also sends the frame to the node connected to the downstream port in the promise cure mode.

In the aforementioned operations, the operation of the upstream hub 212 which receives the transfer request from the downstream hub 211 is the same as the operation of the downstream hub 211 which receives the transfer request from the end node 200. However, the upstream hub 212 is a root hub and there is no upperstream hub thereof. Therefore, the hub 212 gives transfer permission to the node connected to the downstream port without waiting for transfer permission from the upstream hub and sends the request for preparation of receiving to the other downstream nodes.

The root hub 212 gives Silence to the hub 211 as mentioned above, sends the request for preparation of receiving to the hub 213 connected to the downstream port, and sends the frame received from the hub 211 to the hub 213 connected to the downstream port in the promise cure mode using all of the 4-pair wires.

When the hub 213 receives the request for preparation of receiving from the upstream hub 212, it sends the request for preparation of receiving unconditionally to each end node connected to the downstream port thereof. Thereafter, the hub 213 checks the destination address of the frame which is received from the upstream hub 212. When the end node which is the destination of this frame is connected, the hub 213 sends the frame to this end node using all of the 4-pair wires. The hub 213 also sends the frame to the node (in this example, the inter-network connection device 207) connected to the downstream port in the promise cure mode.

During the aforementioned operation, the hub 211 arbitrates the transfer right between the downstream nodes as described below. Namely, when the hub 211 receives Silence from the upstream hub, it selects one of the downstream nodes which send the transfer request by utilizing a round robin system, gives Silence to it, and sends the request for preparation of receiving to the other downstream nodes. For this selection, the transfer request HP works preferentially to the transfer request NP. The downstream node which is given Silence sends the frame, outputs IDLE, and abandons the given transfer right. The hub 211 which receives it outputs IDLE (1) to the remaining downstream nodes excluding the frame destination. When the transfer request is output from the other downstream nodes, the hub 211 selects one of the downstream nodes by utilizing the round robin system again, gives Silence to it, and sends the request for preparation of receiving to the other downstream nodes. When all of the downstream nodes are selected once by the round robin system in this way, the hub 211 sends IDLE to the upstream hub and abandons the given transfer right. However, the uppermost stream hub 212 is a root hub and there is no upper-stream hub thereof. Therefore, without waiting for transfer permission from the upstream hub and sending IDLE to the upstream hub, the hub 212 gives transfer permission continuously to the nodes which are connected to the downstream port thereof and outputs the transfer request by the round robin system sequentially.

When each hub except the root hub receives IDLE from the upstream node, it outputs IDLE to the upstream and downstream nodes. When each hub receives the transfer request from the downstream node thereafter, it outputs the transfer request to the upstream node.

As mentioned above, in the demand priority system, the interface between each node and the upstream node thereof is unified regardless of the end nodes and hubs, and each node other than the root hub operates according to an instruction by the control signal from the upstream hub according to the same protocol. In this protocol, the upstream hub has the control right for sending and receiving to and from the downstream node.

The correspondence between the protocol layer in the demand priority system and the protocol layer of the ISO and OSI reference model is shown in FIG. 21.

As shown in the drawing, in the proposal of IEEE802.12, the data link layer of the OSI reference model is divided into the logical link control sublayer (LLC sublayer) and the medium access control sublayer (MAC sublayer), and the physical layer of the OSI reference model is divided into the physical medium independent sublayer (PMI sublayer) and the physical medium dependent sublayer (PMD sublayer).

The upstream layer interface of the PMD sublayer is defined as a medium independent interface (MII).

Next, the conventional constitution of an end node is shown in FIG. 22.

As shown in the drawing, the end node generally consists of a LAN adapter 300 and a data processor 301 which uses the LAN via the LAN adapter 300.

The LAN adapter 300 has a PMD control unit 2, an MAC/PMI control unit 3, and an interface 302.

The interface 302 is an interface circuit between the LAN adapter 300 and the data processor 301.

The PMD control unit 2 bears the aforementioned PMD sublayer and the MAC/PMI control unit 3 bears the aforementioned MAC sublayer and PMI sublayer. In this constitution, an interface signal between the PMD control unit 2 and the MAC/PMI control unit 3 is defined as the aforementioned MII. The PMD control unit 2 has the predetermined mechanical and electrical structure and matches with a physical interface for sending and receiving a signal between the transmission line (a 4-pair stranded cable) and the control unit 2. An interface signal between the PMD control unit 2 and the MAC/PMI control unit 3 is defined as the aforementioned MII.

The PMD control unit 2 converts a tone signal 24 which is input from the hub via a 2-pair stranded cable to a corresponding receiving state signal 7, transmits it to the MAC/PMI control unit 3, converts a plurality of sending state signals 8 which are sent from the MAC/PMI control unit 3 to corresponding tone signals 27, and outputs them to the hub via a 2-pair stranded cable.

On the other hand, as processing for the PMI sublayer, the MAC/PMI control unit 3 codes for the transmission line for a sending frame which is sent from the data processor via the interface 302 and decodes a receiving frame. Furthermore, as processing for the MAC sublayer, the MAC/PMI control unit 3 recognizes a control signal on the basis of a receiving state signal 7 which is sent from the PMD control unit 2, and generates a plurality of sending state signals 8 for realizing output of a control signal according to the aforementioned sequence. The MAC/PMI control unit 3 also controls sending and receiving of a frame according to the sequence of the recognized control signal.

For example, when a sending frame is sent from the data processor via the interface 302, the MAC/PMI control unit 3 recognizes that IDLE is sent from the hub from the receiving state signal 7, generates a sending state signal 8 for allowing the PMD control unit 2 to generate a tone signal corresponding to the transfer request, sends it to the PMD control unit 2, and recognizes the content of the control signal from the hub according to the kind of received receiving state signal, or absence thereof, which is received from the PMD control unit 2. When the received state signal is Silence, the MAC/PMI control unit 3 sends the coded frame to the hub which is connected via the PMD control unit 2, generates a sending state signal 8 for allowing the PMD control unit 2 to generate a tone signal corresponding to IDLE when the sending is finished, and sends it to the PMD control unit 2.

When the MAC/PMI control unit 3 receives a request for preparation of receiving from the connected hub via the PMD control unit 2, it generates a sending state signal 8 for allowing the PMD control unit 2 to generate a tone signal corresponding to Silence immediately, sends it to the PMD control unit 2, and transmits Silence to the connected hub via the PMD control unit 2. When the MAC/PMI control unit 3 receives a frame from the connected hub via the PMD control unit 2 thereafter, the MAC/PMI control unit 3decodes it and sends it to the data processor 301 via the interface 302.

Next, the constitution of the hub will be explained.

As shown in the drawing, the hub consists of a PMD control unit 2 which is installed on each of the downstream port, upstream port and a frame send receive controller/transfer right arbitrator 303.

The PMD control unit 2 of the hub is at the same position as the PMD control unit 2 which is on an end node. The frame send-receive controller/transfer right arbitrator bears processing for the MAC sublayer and PMI sublayer in the same way as with the aforementioned MAC/PMI control unit 3 which is an end node and as with processing for the PMI sublayer, and it codes for the transmission line for a sending frame which is sent from the data processor and decodes a receiving frame. Furthermore, as processing for the MAC sublayer, it recognizes a control signal from a receiving state signal, generates a tone source signal for each port according to the aforementioned sending and receiving sequence and the transfer right arbitration system, controls sending and receiving of a frame according to the recognized control signal, and transfers a frame between the ports according to the aforementioned frame address and the mode and kind of each port (downstream port and upstream port).

As mentioned above, in the demand priority system, each of the end nodes sends or receives a frame according to an instruction of the hub.

Therefore, when the end nodes are directly connected to each other, they will not operate normally.

For example, when transfer requests NP conflict with each other between end nodes which are directly connected, both of them recognize it as a request for preparation of receiving (Incoming) from the hub, so that all the end nodes output Silence and transfer to the reception waiting state.

When one of the end nodes sends a transfer request HP, the signal is ignored because it is not defined on the end node side which receives it.

On the other hand, when two hubs in which end nodes are connected to all of the downstream ports are connected to each other, one more hub is necessary as an upstream device. However, such a hub is not inexpensive, so that when 2 or 3 end nodes are to be connected to each other or end nodes which are larger by one than the number of downstream ports of the hub are to be connected, it is desirable from a viewpoint of cost and system scale that the end nodes can be directly connected to each other in place of one more hub being prepared. Also when end nodes in the same quantity as the number of downstream ports of a plurality of hubs are to be connected, it is desirable that the plurality of hubs can be directly connected to each other without one more hub being prepared as an upstream hub, or root hub, of the plurality of hubs.

This problem can be solved by newly developing a MAC protocol which enables direct communication between end nodes or hubs, and by installing a function for realizing the MAC protocol in each end node or hub. However, by doing this, the system, particularly the function of each end node becomes complicated and an inexpensive LAN cannot be realized.

SUMMARY OF THE INVENTION

An object of the present invention is to enable direct communication between end nodes under the sending and receiving control by a hub and between upstream ports of the hub with a simple constitution. To accomplish the above object, according to the present invention, a signal processor is combined with a LAN adapter on the end node side which sends or receives a frame by an instruction of the hub on the basis of the demand priority system.

By doing this, the end nodes and the upstream ports of the hub can be directly connected respectively.

Namely, the present invention is, for example, a LAN adapter and has a port controller (2), a signal processor (1), and a frame send-receive controller (3). The port controller (2) sends a control signal and a frame to a send-receive partner node (end node) which is connected via the LAN, and receives a control signal and a frame from the send-receive partner node. The frame send-receive controller (3) changes a control signal which is output to the signal processor to a control signal of a value indicating Silence when the value of the control signal which is relayed from the send-receive partner node via the port controller is changed to a value indicating an occurrence of a transfer request. The frame send-receive controller (3) then receives the frame which is received by the port controller, changes the control signal to be output to the signal processor to a control signal of a value indicating an occurrence of a transfer request when a frame is to be sent to the port controller, and sends the frame to be transferred from the port controller to the send-receive partner node after the value of the control signal which is relayed from the send-receive partner node via the port controller is changed to a value indicating Silence. The signal processor (1) relays the control signal which is output by the frame send-receive partner node to the port controller, relays the control signal which is received by the port controller to the frame send-receive controller, furthermore outputs a control signal of a value indicating an occurrence of a transfer request to the frame send-receive controller when the send-receive partner node outputs a control signal indicating receivable, and controls the relay of the control signal for the port controller and frame send-receive controller so that the frame send-receive controller enters the state that it inputs a control signal of a value indicating an occurrence of the aforementioned transfer request when the send-receive partner node outputs the control signal of the value indicating the occurrence of the transfer request.

In the signal processor of the LAN adapter of the present invention, the frame send-receive control unit of the self LAN adapter and the frame send-receive control unit of the aforementioned another LAN adapter output a control signal of a value indicating an occurrence of a transfer request and control the relay of the control signal so that both of the units will not enter the state that the control signal of the value indicating the occurrence of the transfer request is input at the same time, thus eliminating any conflicts therein.

By doing this, the situation is avoided wherein two LAN adapters which are directly connected conflict with each other in a transfer request at the same time and transfer to the reception waiting state by mutual concessions of transfer.

In the signal processor of the LAN adapter of the present invention, for example, when it converts the standard interface signal (MII) which is supported by the standard frame send-receive control unit, an upstream control signal from an end node which is directly connected thereto is recognized as a downstream control signal from the hub by respective node. This standard frame send-receive control unit is on the market as an LSI.

Therefore, when the LAN adapter of the present invention is applied to an end node or an upstream port of a hub, direct communication between end nodes and upstream ports of the hub can be realized. Furthermore, there is no need to change the conventional signal send-receive unit and frame send receive control unit.

BRIEF DESCRIPTION OF THE DRAWINGS

The present invention will be more apparent from the following detailed description, when taken in conjection with the accompanying drawings, in which:

FIG. 22 is a block diagram showing the constitution of a LAN which is constructed from the conventional end node and hub.

DETAILED DESCRIPTION OF THE PREFERRED EMBODIMENTS

The embodiments of the present invention will be explained hereunder using application examples to the demand priority system of IEEE802.12 mentioned above.

Firstly, the first embodiment of the present invention will be explained.

Figure 1:
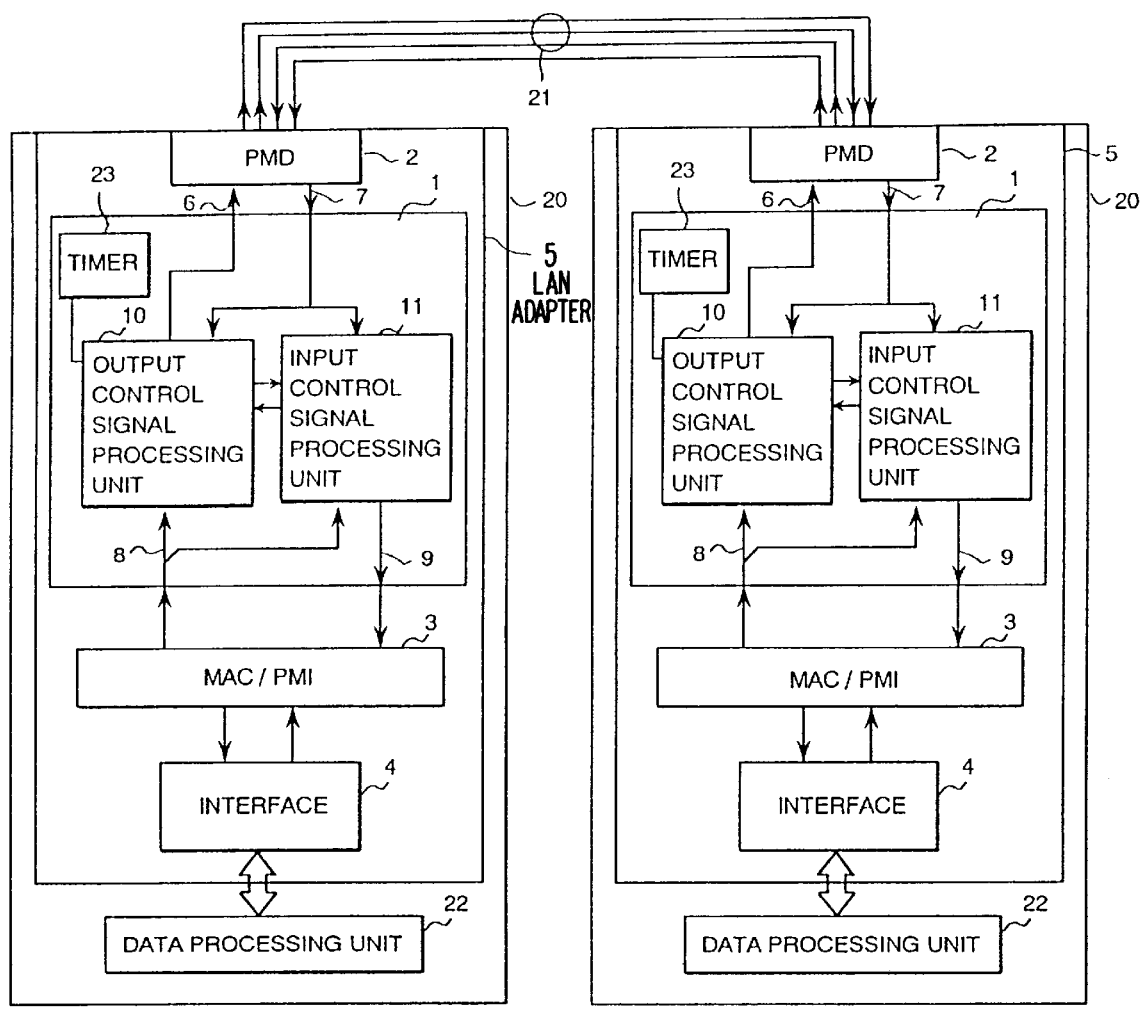
FIG. 1 is a block diagram showing the constitution of the end node of the first embodiment of the present invention.

FIG. 1 shows the constitution of a communication processor 20 having a LAN adapter 5 of this first embodiment. In the drawing, a numeral 22 indicates a data processor.

As shown in the drawing, the LAN adapter 5 has a PMD control unit 2 corresponding to the communication port, a MAC/PMI control unit 3, a signal processor 1 for processing a control signal between the PMD control unit 2 and MAC/PMI control unit, and an interface 4 for controlling the interface between the data processor connected to the LAN adapter 5 and the MAC/PMI control unit 3. The signal processor 1 has an output control signal processor 10, an input control signal processor 11, and a timer 23. The output control signal processor 10 inputs a sending state signal 8 for identifying the state of a tone signal which is output by the MAC/PMI control unit 3 and intended to send by the same unit. and a receiving state signal 7 for informing the state of the received tone signal which is output by the PMD control unit 2, and further outputs a sending state signal 6 for identifying a tone signal to be sent to the PMD control unit. The input control signal processor 11 inputs the sending state signal 8 which is output by the MAC/PMI control unit 3 and the receiving state signal 7 which is output by the PMD control unit 2 and outputs a receiving state signal 9 for identifying the state of a tone signal which is recognized as a state of the tone signal which is received by the MAC/PMI control unit 3 to the PMD control unit 2.

According to the present invention having the aforementioned constitution, the MAC/PMI control unit—23 3 recognizes that the tone signal of the state which is identified by the receiving state signal 9 which is output from the signal processor 1 is received and operates in the same way as conventional systems. The MAC/PMI control unit 3 is the same as a conventional one, so that receiving state signals which can be recognized by the MAC/PMI control unit 3 are only receiving state signals TP3 and TP4 shown in Table 1 which correspond to the states of tone signals which are sent from the hub to the end node, and sending state signals which are output from the MAC/PMI control unit 3 are only sending state signals TP1 and TP2 shown in Table 1 which correspond to the states of tone signals which are sent from the end node to the hub.

The PMD control unit 2 and the MAC/PMI control unit 3 are the same as the PMD control unit 2 and the MAC/PMI control unit 3 of the conventional UAN adapter 300 which are shown in FIG. 22 previously. Namely, the LAN adapter of the this first embodiment has a constitution that the signal processor 1 is added to the conventional LAN adapter shown in FIG. 22.

Figure 2:
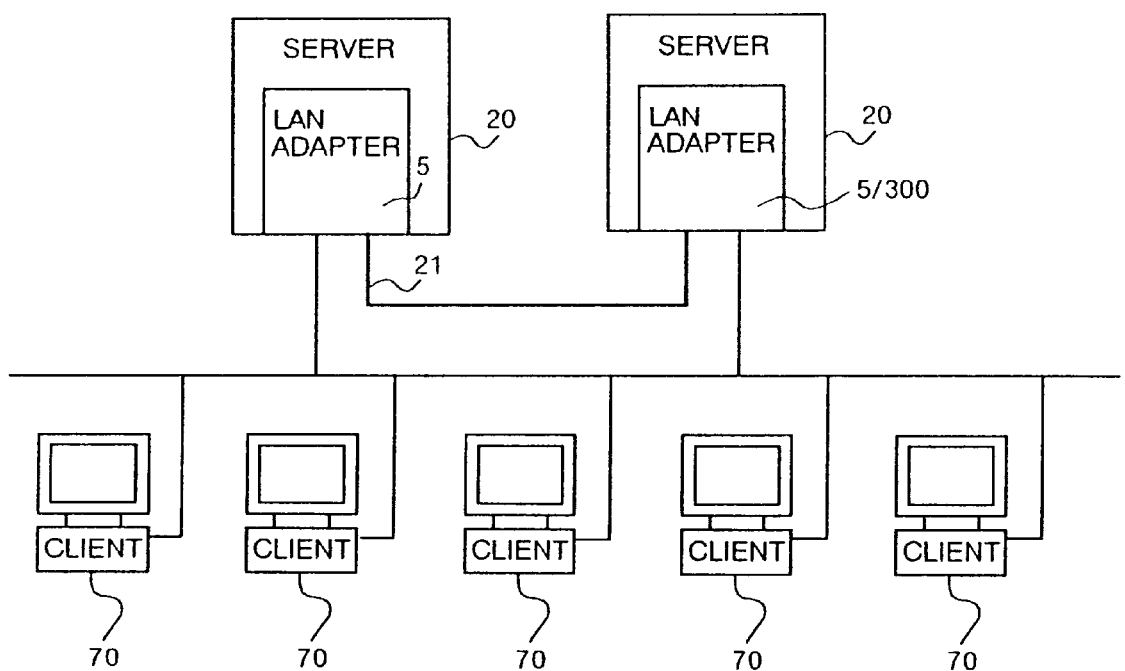
FIG. 2 is a block diagram showing the constitution of the LAN system of the first embodiment of the present invention.
Figure 3:
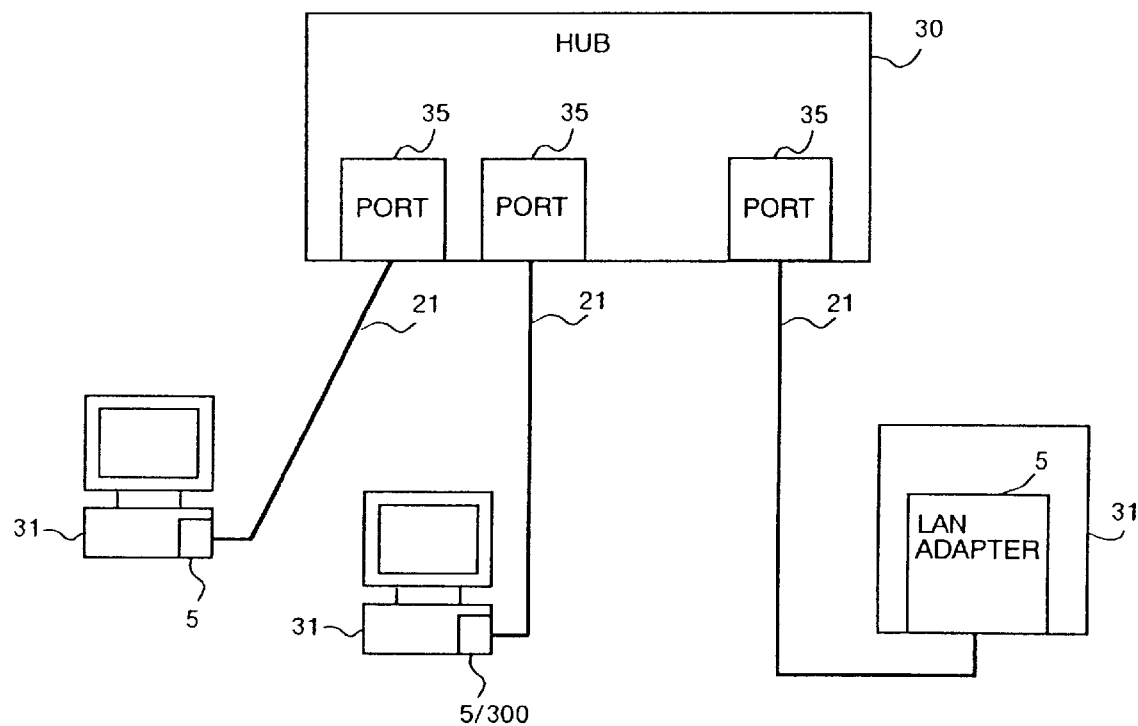
FIG. 3 is a block diagram showing the constitution of the LAN system of the first 5 embodiment of the present invention.

According to this first embodiment, a LAN system having the constitution shown in FIG. 2 or 3 is realized by using the LAN adapter shown in FIG. 1.

In the LAN system shown in FIG. 2, two servers 20 and a plurality of clients 70 are connected by the predetermined LAN. The two servers 20 are directly connected to each other separately from the above LAN. LAN adapters mounted to the two servers 20 are used for this direct connection. There are cases available, such as a case wherein both servers 20 have a LAN adapter 5 as described in this embodiment and a case wherein only one server 20 has a LAN adapter 5 as described in this embodiment, wherein the latter case has a conventional LAN adapter 300.

In the LAN system shown in FIG. 3, each of the ports 35 of a hub 30 is connected to each of a plurality of end nodes 31 via the LAN adapter. Each port of the hub 30 has a constitution which is the same as that of the LAN adapter 5 of this first embodiment and there are cases available, such as a case wherein the end node 30 has a LAN adapter 5 as described this first embodiment and a case wherein the end node 30 has a conventional LAN adapter 300 mentioned above.

Namely, in this first embodiment, by the LAN adapter 5 of this first embodiment, communication between an end node having the LAN adapter 5 of this embodiment and a hub, direction communication between end nodes having the LAN adapter 5 of this embodiment, and direct communication between an end node having the LAN adapter 5 of this embodiment and an end node having the conventional LAN adapter can be realized.

As mentioned above, a tone signal shown in Table 1 is sent or received between the nodes. As shown in Table 1, Silence which is sent from the end node to the hub and a tone signal of permission of sending which is sent from the hub to the end node have the same value, Idle which is sent from the end node to the hub and a tone signal of Idle which is sent from the hub to the end node are in the same state, and Request N which is sent from the end node to the hub and a tone signal of request for preparation of receiving which is sent from the hub to the end node have the same value, and Training Req which is sent from the end node to the hub and a tone signal of Training Idle which is sent from the hub to the end node are in the same state.

Actually, a receiving state signal and a sending state signal corresponding to any of Silence and permission of sending, Idle from the end node and Idle from the hub, Request N and a request for preparation of receiving, or Training Req and Training Idle have the same values. Namely, the PMD control unit 2 and the signal processor 1 execute processing without distinguishing the receiving state signal and sending state signal. Only the MAC/PMI control unit 3 recognizes that the meaning of the receiving state signal is a meaning corresponding to a tone signal from the hub to the end node and outputs a sending state signal in a meaning corresponding to a tone signal which is output from the end node to the hub.

To provide an understanding of the explanation hereinafter, the states of tone signals which are identified by a state signal and a sending state signal corresponding to the states of tone signals corresponding to Silence and permission of sending which are input or output by the signal processor 1 and the PMD control unit 2 are called a Silent 10 state.

The states of tone signals which are identified by a state signal and a sending state signal corresponding to tone signals in the states corresponding to Idle from the hub and Idle from the end node which are input or output by the signal processor 1 and the PMD control unit 2 are called Idle. The states of tone signals which are identified by a state signal and a sending state signal corresponding to tone signals in the states corresponding to Request N and a request for preparation of receiving which are input or output by the signal processor 1 and the PMD control unit 2 are called by one of the names of transfer request and request for preparation of receiving which is suited to explanation.

Also the states of tone signals which are identified by a state signal and a sending state signal corresponding to tone signals in the states corresponding to Training Req and Training Idle which are input or output by the signal processor and the PMD control unit 2 are called by one of the names of Training Req and Training Idle which is suited to explanation.

A state signal and a sending state signal which are input or output between the signal processor 1 and the MAC/PMI control unit 3 are described below. Namely, the state of a tone signal which is identified by the state signal is called by the name of the corresponding tone signal from the hub to the end node, and the state of a tone signal which is identified by the sending state signal is called by the name of the corresponding tone signal from the end node to the hub.

In all cases, the states of tone signals which are identified by a receiving state signal and a sending state signal which identify the tone signals of Request N and Request H are called a transfer request excluding a case in which they require distinction.

The LAN adapter 5 of this first embodiment will be 5 explained in detail hereunder.

When the signal processor 1 is connected to the partner node and started, it decides whether the partner node connected to the respective LAN adapter is a hub or an end node having a conventional LAN adapter 300 or an end node having a LAN adapter 5 of this first embodiment and sets one of the modes of the end node, hub, and equivalent connection according to the partner node.

Figure 4:
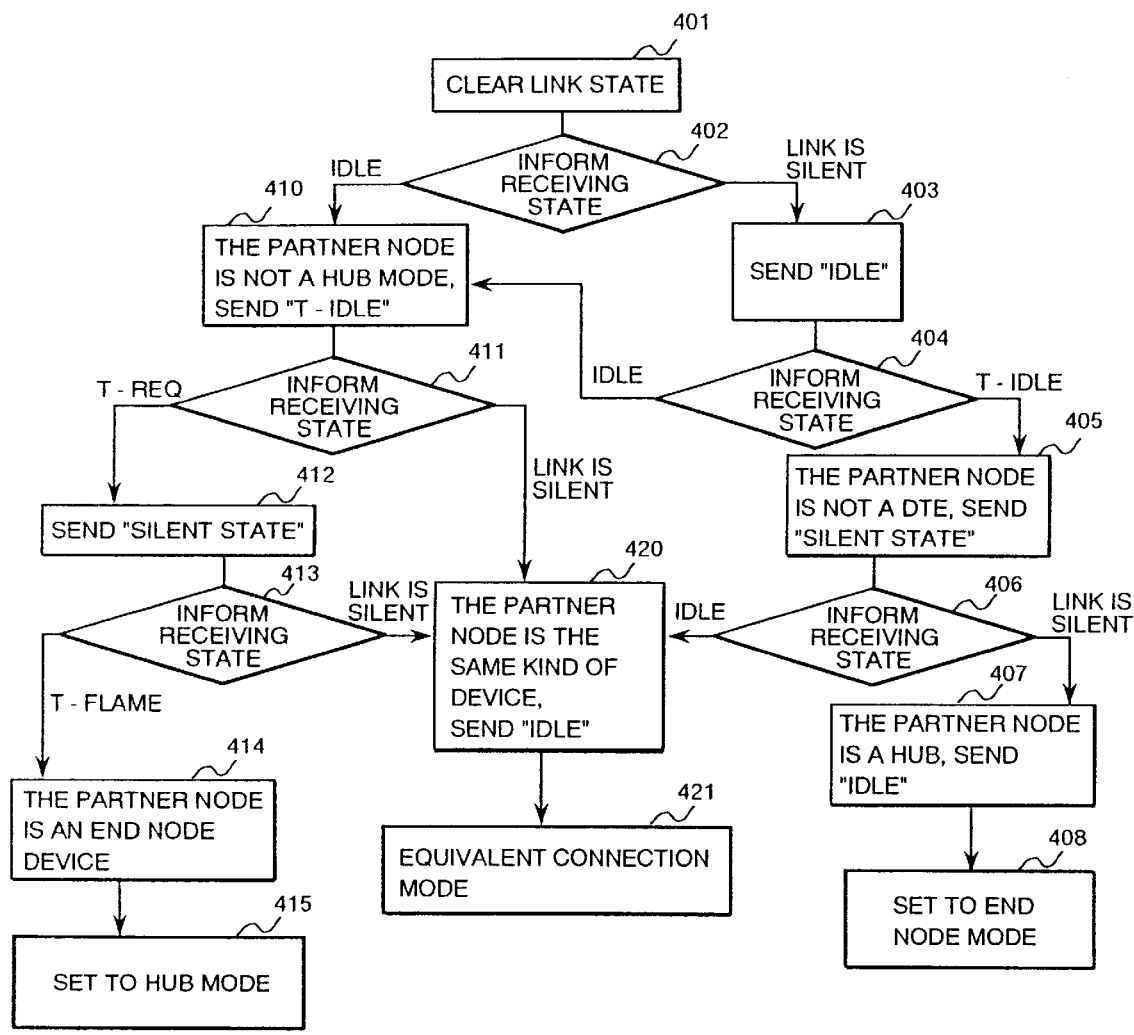
FIG. 4 is a flow chart showing the procedure for the operation mode setting process which is executed by the control process unit of the first embodiment of the present invention.

The mode is set by cooperation of the input control signal converter 11 and the output signal selector 10 according to the flow chart shown in FIG. 4.

During the execution period of the processing of this flow chart, the signal processor 1 outputs a receiving state signal indicating the Silent state to the MAC/PMI control unit 3. During this period, a sending state signal which is output from the MAC/PMI control unit 3 is ignored.

In this flow chart, according to the connection check rule for the demand priority system of IEEE802.12, when the partner node operates as an end node, the hub mode is set, and when the partner node operates as a hub, the end node mode is set, and furthermore in this embodiment, when the partner node performs an operation which does not coincide with the connection check rule, the equivalent connection mode is set. Also in this flow chart, the signal processor 1 recognizes the state of the tone signal which is received from the partner node from the state of the tone signal which is identified by the state signal 7 which is output by the PMD control unit 2 and sends the state of the tone signal which is identified by the sending state signal 6 to the partner node by the PMD control unit 2.

Namely, when the tone signal which is received from the partner node in the initial state is in the Silent state (Step 402), the signal processor 1 sends Idle (Step 403), and when the signal processor 1 receives Idle from the partner node (Step 404) or when Idle is received from the partner node in the initial state (Step 402), the signal processor 1 decides that the partner node is not a hub (Step 410). Then, the signal processor 1 sends Training Idle (Step 410), and when the partner node outputs Training Req in response to it (Step 411), it sends "Silent state" (permission of sending) (Step 412), and when it receives a training packet in response (Step 413), it decides that the partner node is an end node (Step 414) and sets the hub mode (Step 415).

On the other hand, when the tone signal which is received from the partner node in the initial state is in the silent state (Step 402), the signal processor 1 sends Idle (Step 403) and when it receives "Silent state" from the partner node (Step 406) when it receives Training Idle from the partner node (Step 404) and sends "Silent state" for it (Step 405), it decides that the partner node is a hub and sends Idle (Step 407) and also sets the end node mode (Step 408).

Next, a case that the equivalent connection mode is set will be explained.

Figure 6A:
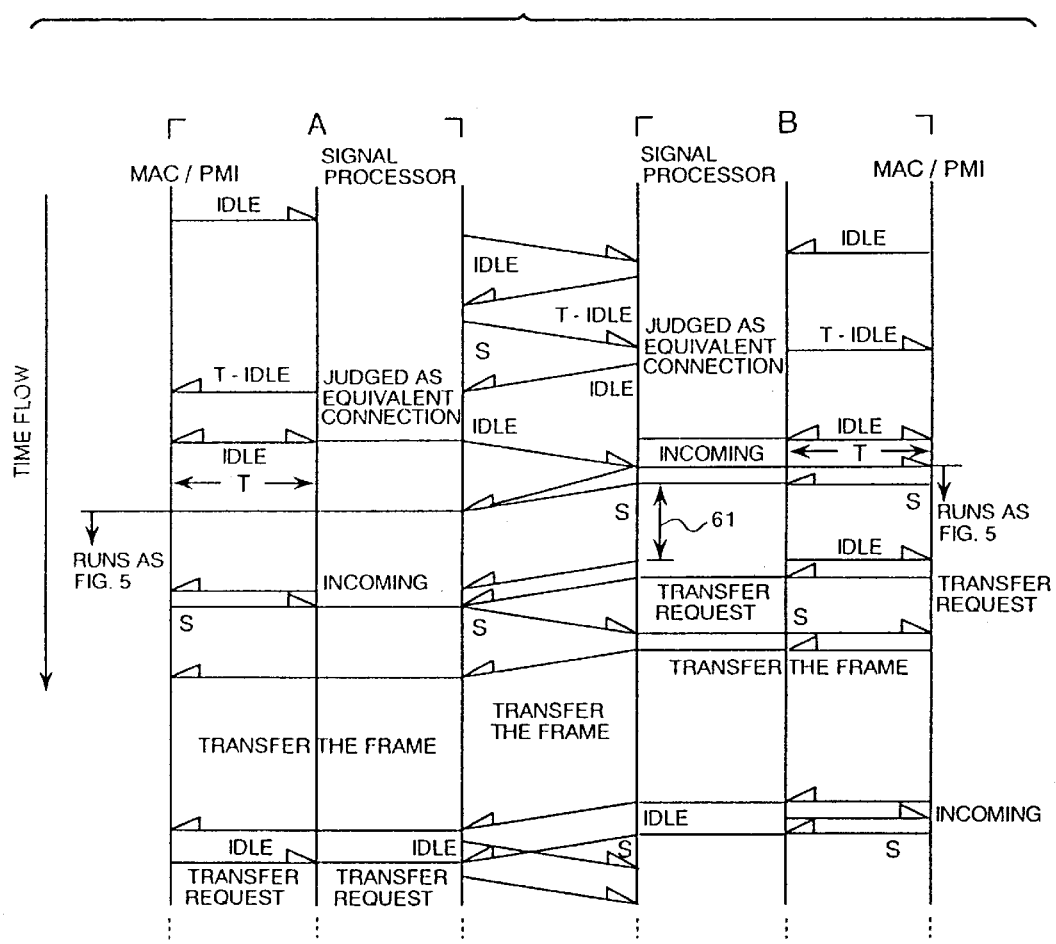
FIGS. 6(a) and 6(b) are timing charts indicating the communication sequence between nodes of the first embodiment of the present invention.
Figure 6B:
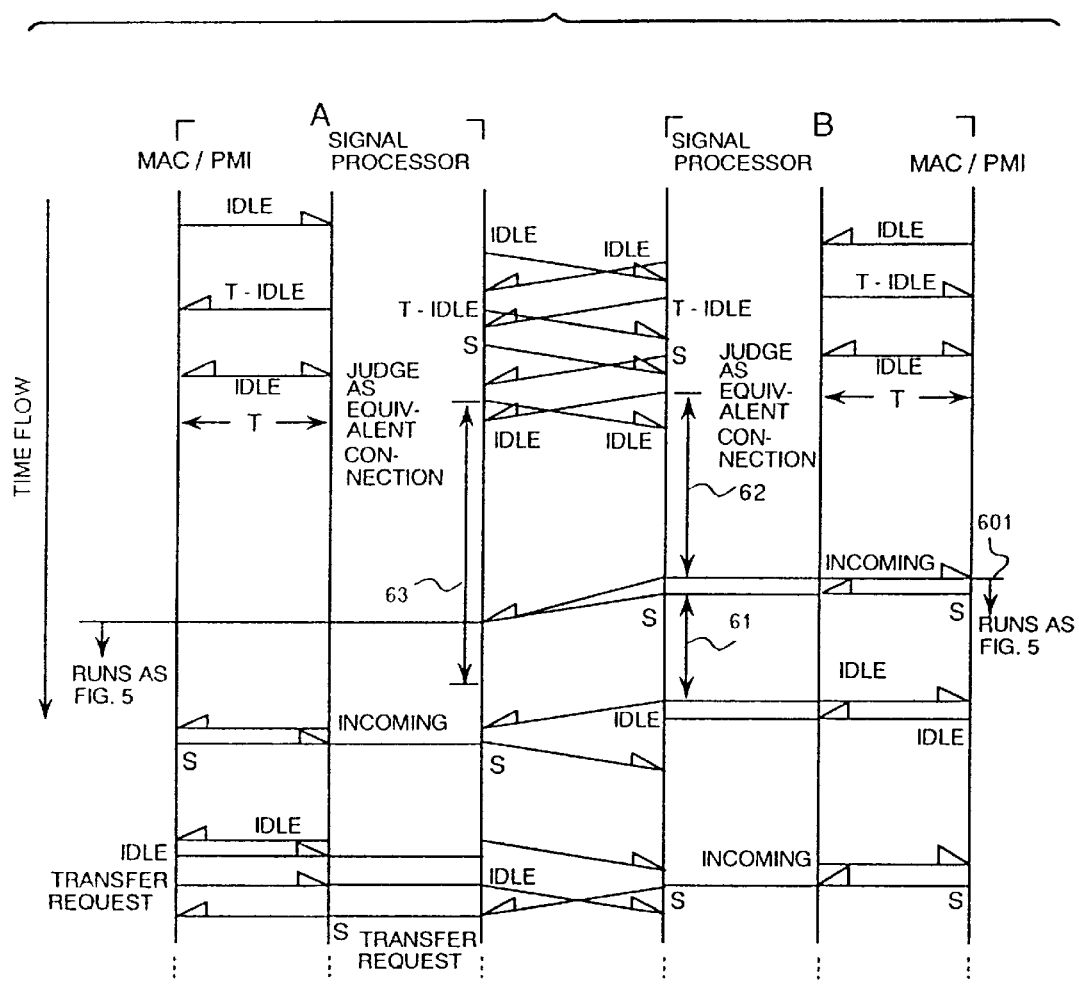

FIG. 6 shows a communication sequence between two end nodes A and B having the LAN adapter 5 of this first embodiment.

FIG. 6($a$) shows a case that the processing start time of the flow chart shown in FIG. 4 is different between the end nodes A and B.

In this case, as shown in the drawing, the signal processor 1 of the end node A which starts the processing of the flow chart shown in FIG. 4 first sends Idle (Step 403) because the tone signal which is received from the end node B in the initial state is in the Silent state (Step 402).

On the other hand, the signal processor 1 of the end node B receives Idle from the end node A in the initial state (Step 402), so that it sends Training Idle to the end node A (Step 410).

When the signal processor 1 of the end node A receives Training Idle (Step 404), it sends "Silent state" to the end node B (Step 405).

When the signal processor 1 of the end node B receives "Silent state" (Step 406), it sends Idle and sets the equivalent connection mode (Step 420).

When the signal processor 1 of the end node A receives this Idle, it sends Idle and sets the equivalent connection mode (Step 421).

By doing this, both of the end nodes A and B set the equivalent connection mode.

Next, FIG. 6($b$) shows a case wherein the end nodes A and B start the processing of the flow chart shown in FIG. 4 at the same time.

In this case, as shown in the drawing, the signal processors 1 of the end nodes A and B receive "Silent state" in the initial state (Step 402), so that both of them send Idle (Step 403) and receive Idle (Step 404). Then, both of them send Training Idle (Step 410). Then, both of them receive Training Req (the tone signal state is the same as that of Training Idle) (Step 411), so that both of them send "Silent state" (Step 412). Then, both of them receive "Silent state" (Step 413), so that both of them send idle (Step 420) and set the equivalent connection mode (Step 421).

When the mode according to the partner node connected can be set as mentioned above, the signal processor 1 executes the predetermined training with the MAC/PMI control unit 3 as shown in FIG. 6. Hereafter, the signal processor 1 executes the general communication processing according to the operation mode which is previously set.

When the equivalent connection mode is set first, the signal processor 1 executes the following processing.

Firstly, the signal processor 1 decides the process in the flow chart shown in FIG. 4 through which the equivalent connection mode is set.

Figure 5:
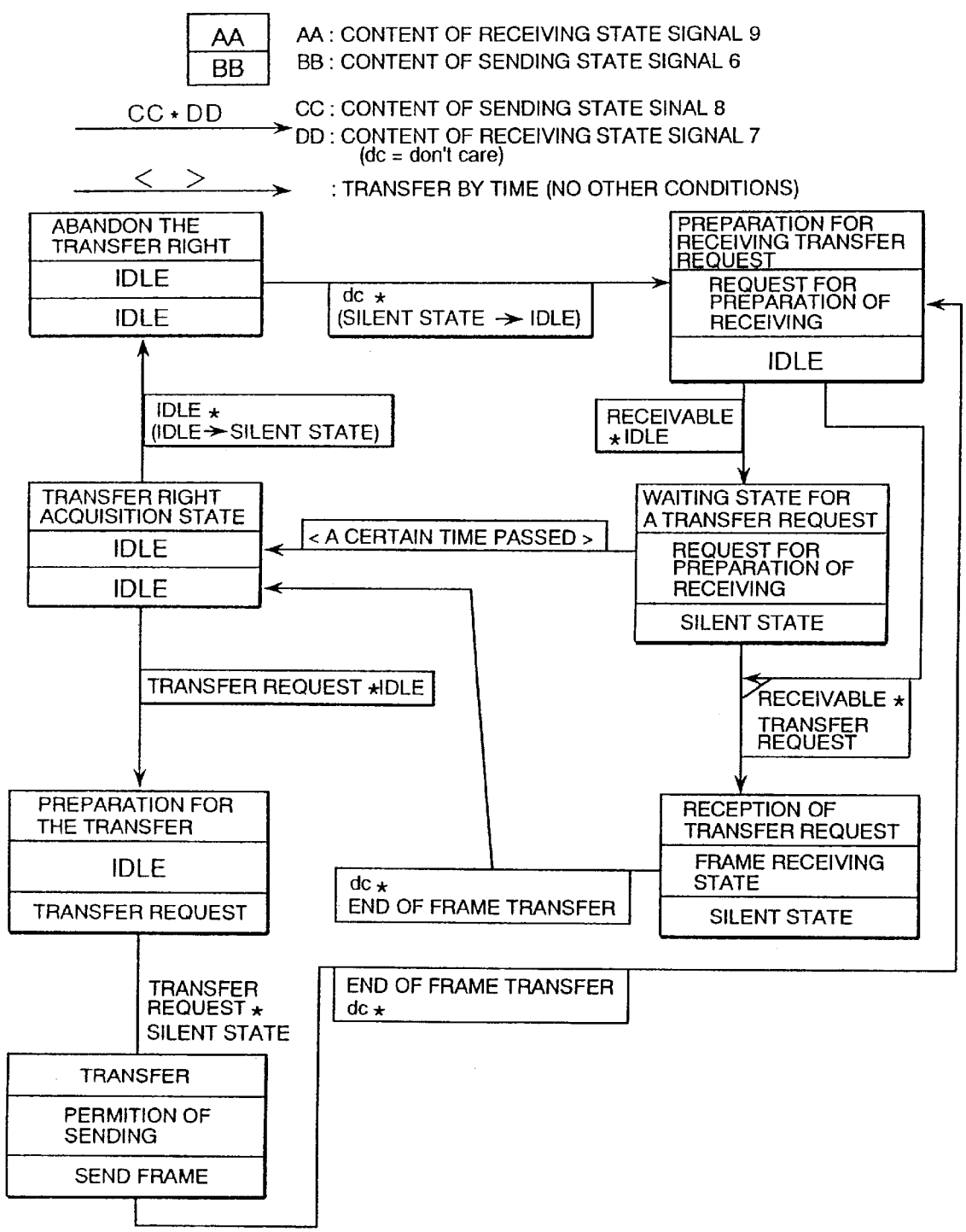
FIG. 5 is a state transfer diagram indicating the state transfer in the equivalent connection mode of the control process unit of the first embodiment of the present invention.

When the signal processor 1 receives "Silent state" and sets the equivalent connection mode at Step 411 (in the case of B shown in FIG. 6($a$)), it transfers to the "preparation for receiving transfer request" state shown in FIG. 5 after it receives Idle from the partner A. Hereafter, the signal processor 1 transfers according to the state transfer diagram shown in FIG. 5. On the other hand, when the signal processor 1 sets the equivalent connection mode via Step 406 (in the case of A shown in FIG. 6($a$)), it transfers to the "transfer right abandonment" state shown in FIG. 5 after it receives "Silent state" from the partner B. Hereafter, the signal processor 1 transfers according to the state transfer diagram shown in FIG. 5.

On the other hand, when the signal processor 1 sets the equivalent connection mode via Step 413 (in the case of A and B shown in FIG. 6($b$)), it starts the timer 23 installed in the signal processor 1. The constitution of the timer 23 is shown in FIG. 7.

Figure 7:
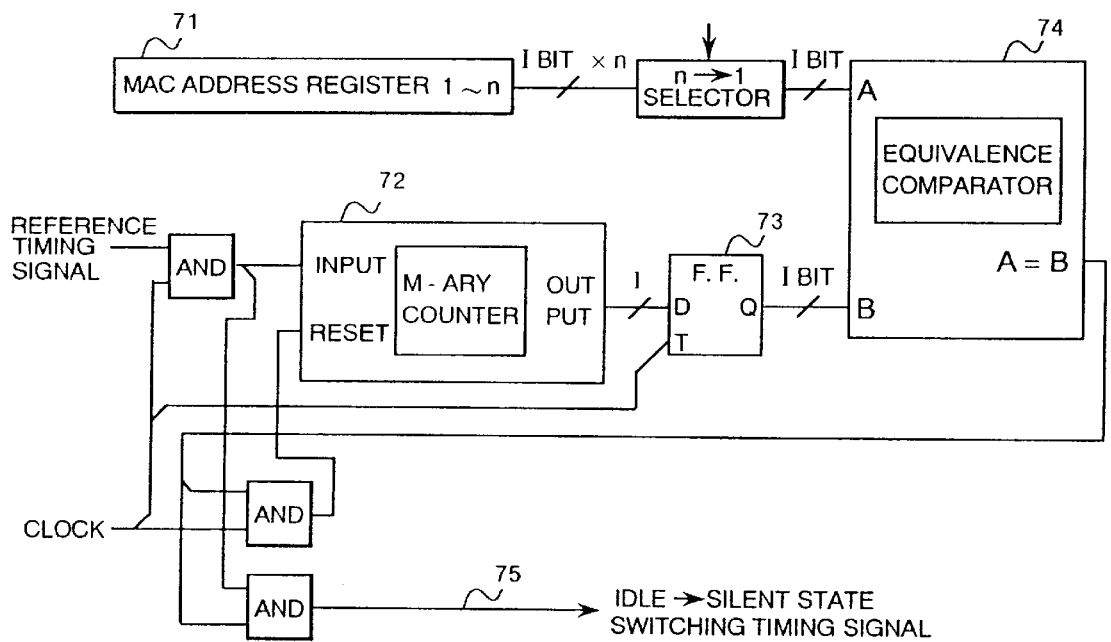
FIG. 7 is a block diagram showing the constitution of the timer of the first embodiment of the present invention.

In FIG. 7, in this embodiment in which different numerical values are set in n registers 71, n MAC address registers in which an address i ×n bits in length which is intrinsic to each node is generally set in units of i bits are used as registers.

Symbols i, m, and n shown in the drawing are values which satisfy i=log2 m and i ×n=48 (i, m, n: integers). In this embodiment, i, m, and n are assumed as 4, 16, and 12 respectively.

An m-ary (hexadecimal) counter 72 is incremented by one starting from 0 when an input signal is started. As an input signal, a reference timing signal which generates a pulse at the predetermined time interval and is synchronized with the predetermined clock by the AND gate is used.

On the other hand, a 4-bit signal which is obtained by delaying an output signal of the m-ary counter 72 by one clock is input to an equivalence comparator 74 and compared with a 4-bit signal which is selected from one of the MAC address registers 1 to 12. When the compared values are equal, the signal processor 1 outputs a switching timing signal 75, resets the timer, suppresses input of the reference timing signal, and stops it. When the switching timing signal 75 is output (a time interval 62 shown in FIG. 6($b$) elapses), the signal processor 1 transfers to the "preparation for receiving transfer request" state and sends "Silent state" to the partner node (601 shown in FIG. 6($b$)). Hereafter, the signal processor 1 transfers according to the state transfer diagram shown in FIG. 5. When the signal processor 1 receives "Silent state" from the partner node immediately after it sends "Silent state" to the partner node, it means that the nodes A and B transfer to the "preparation for receiving transfer request" state at the same time. Therefore, the signal processor 1 sends Idle, gets out of the state transfer shown in FIG. 5, and switches one of the MAC address registers 1 to 12 which selects a 4-bit signal and repeat the above processing.

On the other hand, when the signal processor 1 receives "Silent state" from the partner node before the compared values coincide with each other, that is, in the state that Idle is sent, it resets the timer, suppresses input of the reference timing signal, and stops it. The signal processor 1 transfers to the "transfer right abandonment" state shown in FIG. 5 and hereafter transfers the state according to the state transfer diagram shown in FIG. 5.

The value of at least one register among the n MAC address registers is different from the values of the nodes A and B. Therefore, by the above processing, even in the case shown in FIG. 6(b), in the same way as with the case shown in FIG. 6(a), one of the two signal processors 1 of the nodes A and B can be transferred to the "preparation for receiving transfer request" state and the other can be transferred to the "transfer right abandonment" state.

When the signal processor 1 transfers to one of the "preparation for receiving transfer request" state and the "transfer right abandonment" state as mentioned above, it transfers the state according to the state transfer diagram shown in FIG. 5 as mentioned above.

In the state transfer diagram shown in FIG. 5, a receiving state signal 9 which is output from the input control signal processor 11 of the signal processor 1 to the MAC/PMI control unit 3 is shown in the upper row of the box indicating the state and a sending state signal 6 which is output from the output control signal processor 10 of the signal processor 1 to the PMD control unit 2 is shown in the lower row. Aside each arrow indicating state transfer, a combination of a receiving state signal 7 which is output by the PMD control unit and a sending state signal 8 which is output by the MAC/PMI control unit 3, which cause the transfer, is shown.

In the initial state as mentioned above, the two LAN adapters 5 are in the "preparation for receiving transfer request" state and the "transfer right abandonment" state respectively.

According to the state transfer diagram, the two signal processors 1 of both of the nodes repeat transfer in the order of "transfer right acquisition state", "transfer right abandonment state", "preparation for receiving transfer request state", and "waiting state for transfer request" respectively so that they do not enter the same state when there is no transfer request from the MAC/PMI control unit 3. For example, when the signal processor 1 of the node B is in the "preparation for receiving transfer request state" and transfers a request for preparation of receiving to the MAC/PMI control unit 3, the MAC/PMI control unit 3 returns Silence unconditionally, so that the signal processor 1 of the node B transfers to the "waiting state for transfer request" and sends "Silent state" to the partner node A. When a certain time passes in the "waiting state for transfer request", the signal processor of the node B transfers to the "transfer right acquisition" state and sends Idle to the node A.

The signal processor 1 of the partner node A in the "transfer right abandonment" state which receives the aforementioned Idle transfers to the "preparation for receiving transfer request" state, transfers to the "waiting state for transfer request" in the same way as with the node B mentioned above, and sends "Silent state" to the node B. The signal processor 1 of the node B which receives the "Silent state" transfers to the "transfer right abandonment" state.

As mentioned above, the two signal processors 1 of both of the nodes repeat transfer in the order of "transfer right acquisition state", "transfer right abandonment state", "preparation for receiving transfer request state", and "waiting state for transfer request" respectively so that they do not enter the same state when there is no transfer request from the MAC/PMI control unit 3, thus avoiding any conflict.

A transfer request from the MAC/PMI control unit 3 is accepted only when the signal processor 1 is in the "transfer right acquisition" state. Namely, when the signal processor 1 in the "transfer right acquisition" state knows a transfer request by a sending state signal 8 from the MAC/PMI control unit 3, it transfers to the "preparation for transfer" state, switches the sending state signal 6 to "transfer request", confirms that the partner node is changed to "Silence" of the receiving state signal 7, and then transfers to the "transfer" state and starts frame sending.

When the frame transfer ends, the signal processor 1 enters the "preparation for receiving transfer request state" and transfers to the "waiting state for transfer request".

When the signal processor 1 detects a "transfer request" from the partner node, it accepts it. When the signal processor 1 detects no "transfer request", it transfers to the "transfer right acquisition state" after a certain time (a time 61 shown in FIG. 6) passes.

On the other hand, when the signal processor 1 in the "preparation for receiving transfer request state" or the "waiting state for transfer request" detects a "transfer request" from the partner node, it waits for input of a frame and starts frame receiving. When the frame transfer ends, the signal processor 1 enters the "transfer right acquisition state". When the sending state signal 8 shows "transfer request" before the partner node is changed to the Silent state, the signal processor 1 transfers to the "preparation for transfer" state and to the "transfer" state. When the sending state signal 8 is kept as "Idle", the signal processor 1 transfers to the "transfer right abandonment state" at the timing that a tone signal from the partner node is changed to the Silent state. In the state transfer diagram shown in FIG. 5, a transfer request is output from the MAC/PMI control unit 3 even when the signal processor 1 is in the "transfer right abandonment" state. However, this transfer request is ignored by the signal processor.

In the aforementioned processing, a transfer request HP (Request H) which cannot be recognized by the MAC/PMI control unit 3 will not be transferred to the MAC/PMI control unit 3 by the signal processor 1.

The operation of the signal processor 1 in the equivalent connection mode has been explained above. In this equivalent connection mode, the signal processors of both of the nodes transfer the states thereof so that they do not enter the same state at the same time according to FIG. 5 and receive a transfer request from the MAC/PMI control unit 3 only when they are in the "transfer right acquisition" state, so that no transfer requests will be conflicted with each other. Therefore, the LAN system shown in FIG. 2 in which the two servers 20 have the LAN adapter 5 of this embodiment can be realized. Furthermore, the LAN system shown in FIG. 3 in which each of the connection ports 35 of the hub 30 has a constitution which is the same as that of the LAN adapter 5 of this first embodiment and each of the end nodes 31 has the LAN adapter 5 of this first embodiment can also be realized. The transfer chance is given equally to both of the nodes.

Next, the operation of the signal processor 1 when the hub mode is set will be explained.

Figure 8:
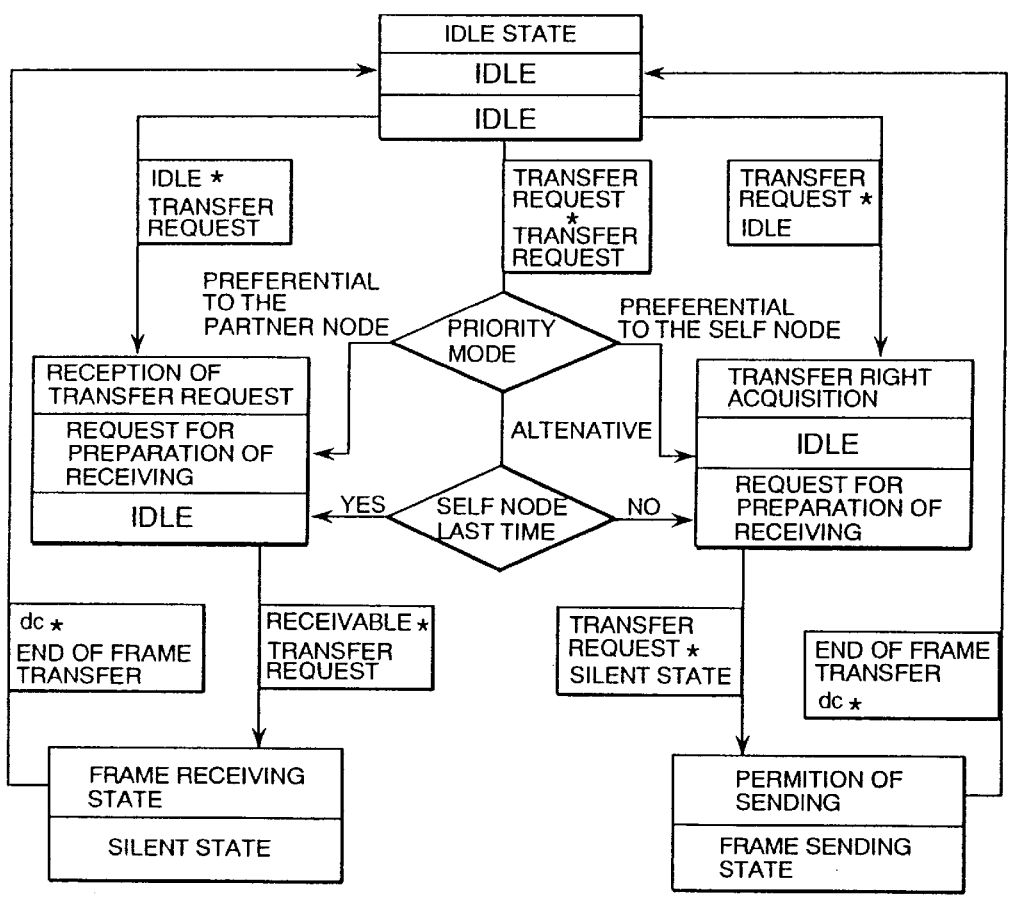
FIG. 8 is a state transfer diagram indicating the state transfer in the hub mode of the control process unit of the first embodiment of the present invention.

FIG. 8 shows a state transfer diagram which is followed by the signal processor 1 in this case.

In this case, the signal processor 1 enters the Idle state shown in FIG. 8 first. In the hub mode, except the case wherein both a receiving state signal 7 which is received from the PMD control unit 2 and a sending state signal 8 which is received from the MAC/PMI control unit 3 are a transfer request, the signal processor 1 just transfers the receiving state signal 7 which is received from the PMD control unit 2 to the MAC/PMI control unit 3 as a state signal 9 and transfers the sending state signal 8 which is received from the MAC/PMI control unit 3 to the PMD control unit 2 as a sending state signal 6. However, when the signal processor 1 receives Request H from the PMD control unit 2, the unit converts it to a request for preparation of receiving (identifies the state of a tone signal which is the same as that of a transfer request NP (Request N)) and transfers it to the MAC/PMI control unit 3. When the signal processor 1 receives Request H from the MAC/PMI control unit 3, the unit converts it to Request N and transfers it to the PMD control unit 2.

On the other hand, when both a receiving state signal 7 which is received from the PMD control unit 2 and a sending state signal 8 which is received from the MAC/PMI control unit 3 are a transfer request, the signal processor 1 executes processing according to one of the three modes such as "preferential to self node", "preferential to partner node", and "alternate". One of the modes is set by the signal processor 1 beforehand.

When the preferential to self node mode is set and when both the receiving state signal 7 which is received from the PMD control unit 2 and the sending state signal 8 which is received from the MAC/PMI control unit 3 are a transfer request, the signal processor 1 transfers the transfer request to the PMD control unit 2 but it transfers Idle to the MAC/PMI control unit 3 in place of the transfer request. (When the signal processor 1 receives Request H from the MAC/PMI control unit 3, the unit converts it to Request N and transfers it to the PMD control unit 2.)

On the other hand, when the preferential to partner node mode is set and when both the receiving state signal 7 which is received from the PMD control unit 2 and the sending state signal 8 which is received from the MAC/PMI control unit 3 are a transfer request, the signal processor 1 transfers a request for preparation of receiving (identifies the state of a tone signal which is the same as that of Request N) to the MAC/PMI control unit 3 but it transfers Idle to the PMD control unit 2 in place of the transfer request.

When the alternate mode is set, the signal processor 1 switches and alternately executes the preferential to self node mode and the preferential to partner node mode whenever the transfer requests conflict with each other.

By doing this, when transfer requests conflict with each other between the self node and the partner node, both of the partner node and self node can be prevented from entering the preparation of receiving state by giving priority to the transfer request of the respective node or partner node. In the hub mode, the partner node is generally an end node. Therefore, the signal processor 1 recognizes an end node having the LAN adapter of this embodiment as a hub and gives priority to the received transfer request at the time of conflict of transfer requests.

In this hub mode, the LAN system shown in FIG. 2 in which only one of the two servers 20 has the LAN adapter 5 of this embodiment can be realized. Furthermore, the LAN system shown in FIG. 3 in which the O connection ports 35 of the hub 30 has a constitution which is the same as that of the LAN adapter 5 of this first embodiment and each of the end nodes 31 has the conventional LAN adapter 300 can be realized.

When the next remaining end node mode is set, the signal processor 1 transfers the receiving state signal 7 which is received from the PMD control unit 2 to the MAC/PMI control unit 3 as a state signal 9 as it is and transfers the sending state signal 8 which is received from the MAC/PMI control unit 3 to the PMD control unit 2 as a sending state signal 6. In this case, the adapter 5 operates in the same way as with the conventional case that the signal processor 1 is not provided.

As explained above, according to this embodiment, an end node having the signal processor 1 of this embodiment can communicate directly with a partner node regardless of whether it is a hub, an end node, or an end node having the signal processor 1 of this embodiment.

The first embodiment of the present invention has been explained above.

The second embodiment of the present invention will be explained hereunder.

Figure 9:
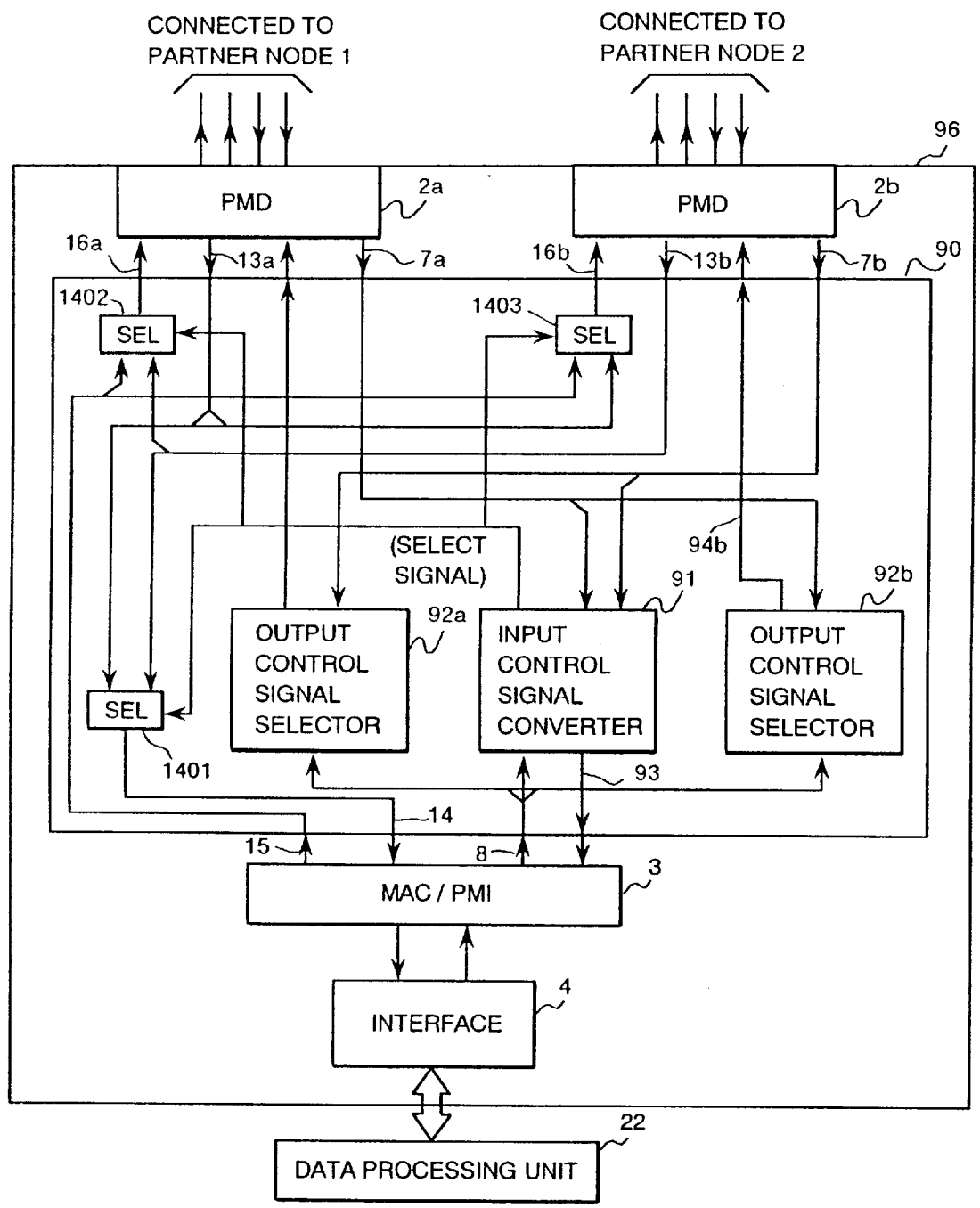
FIG. 9 is a block diagram showing the constitution of the end node of the second embodiment of the present invention.

FIG. 9 is the constitution of the end node of the second embodiment of the present invention.

In the drawing, numeral 22 indicates a data processor and indicates a 2-port LAN adapter.

As shown in the drawing, the 2-port LAN adapter 90 has two PMD control units 2a and 2b corresponding to two communication ports, a MAC/PMI control unit 3, a signal processor 1 for executing the conversion and delay processing for a control signal between the aforementioned units, and an interface 4 for controlling interfacing between the data processor 22 connected to the 2-port LAN adapter 90 and the MAC/MI control unit 3.

The PMD control units 2a and 2b and the MAC/PMI control unit 3 are the same as the PMD control unit 2 and the MAC/PMI control unit 3 which are shown in FIG. 22 previously.

Namely, the end node of this second embodiment has a constitution whereby the PMD control unit 2b and the signal processor 1 are added to the conventional end node shown in FIG. 22.

As shown in the drawing, the signal processor 1 has an input control signal converter 91, two output control signal selectors 92a and 92b, and three selectors 1401, 1402, and 1403.

Figure 10:
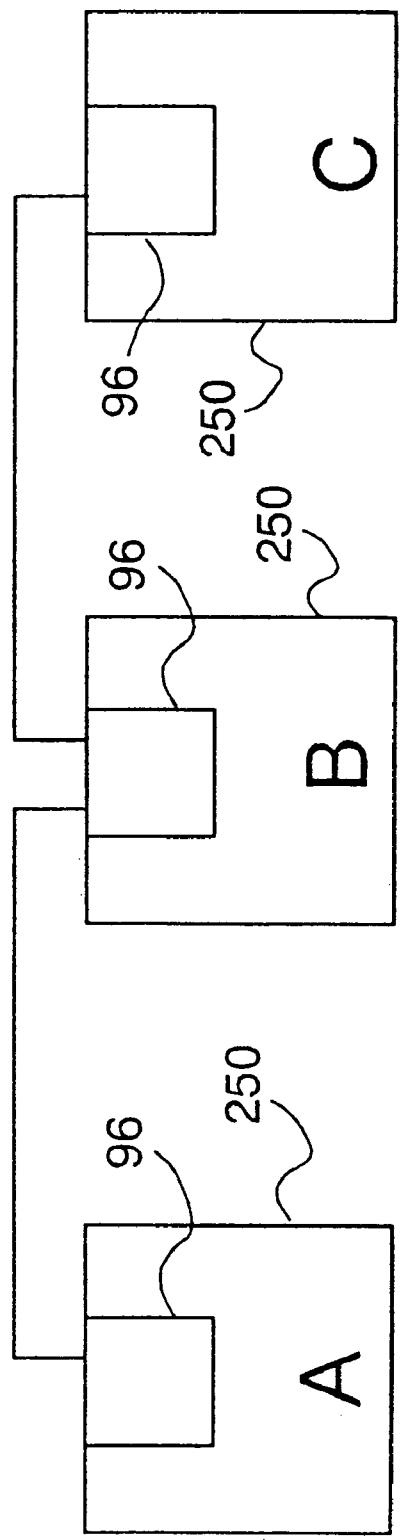
FIG. 10 is a drawing showing the first connection example of the end node of the second embodiment of the present invention.
Figure 11:
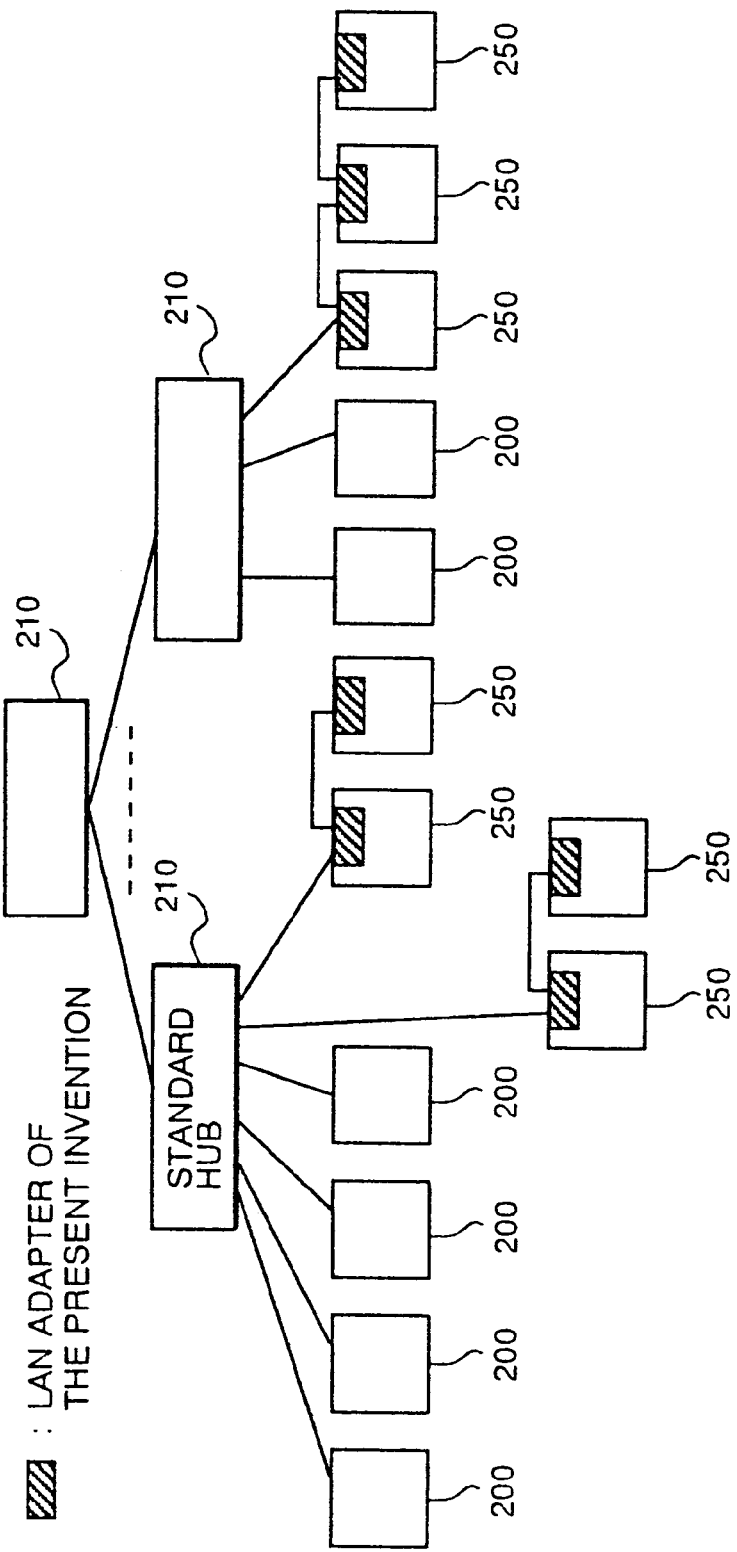
FIG. 11 is a drawing showing the second connection example of the end node of the second embodiment of the present invention.

In this second embodiment, a LAN system having the constitution shown in FIG. 10 or 11 is realized using the end nodes shown in FIG. 9. In FIG. 10, the end nodes 250 shown in FIG. 9 are connected in a "daisy chain".

Figure 19:
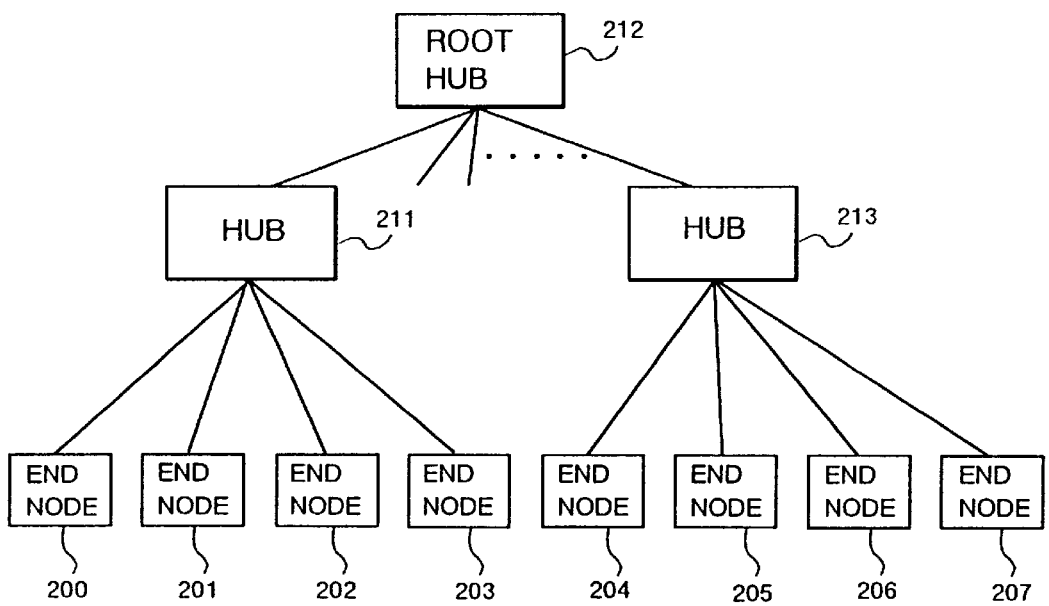
FIG. 19 is a block diagram showing the constitution of a conventional LAN system.
Figure 20A:
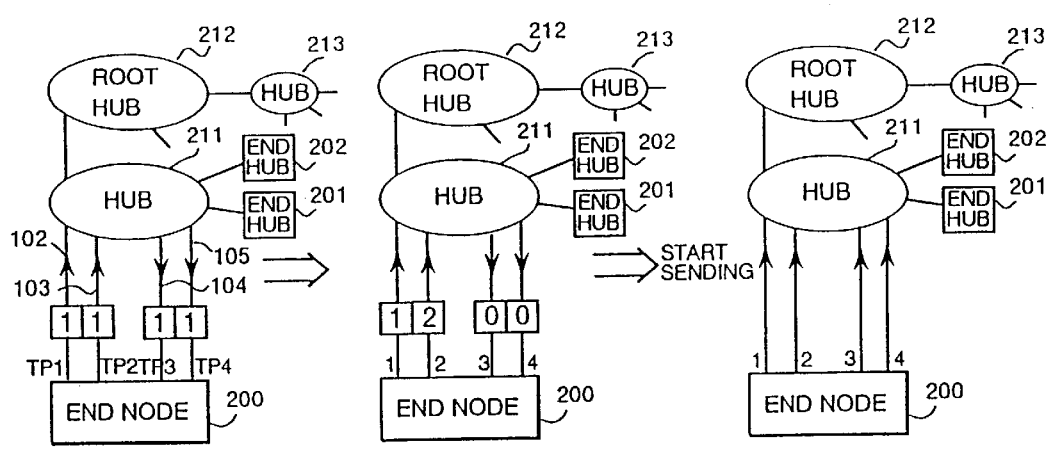
FIGS. 20A and 20B is a drawing showing the frame transfer operation between the conventional hub and end node.
Figure 20B:
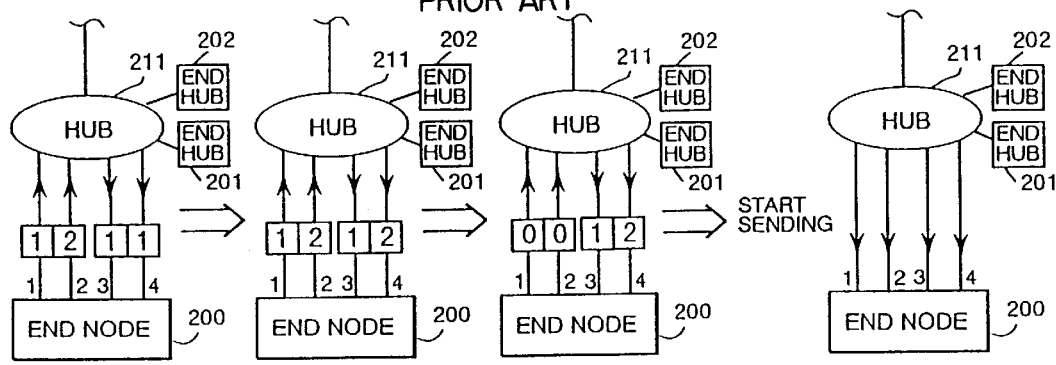
Figure 21:
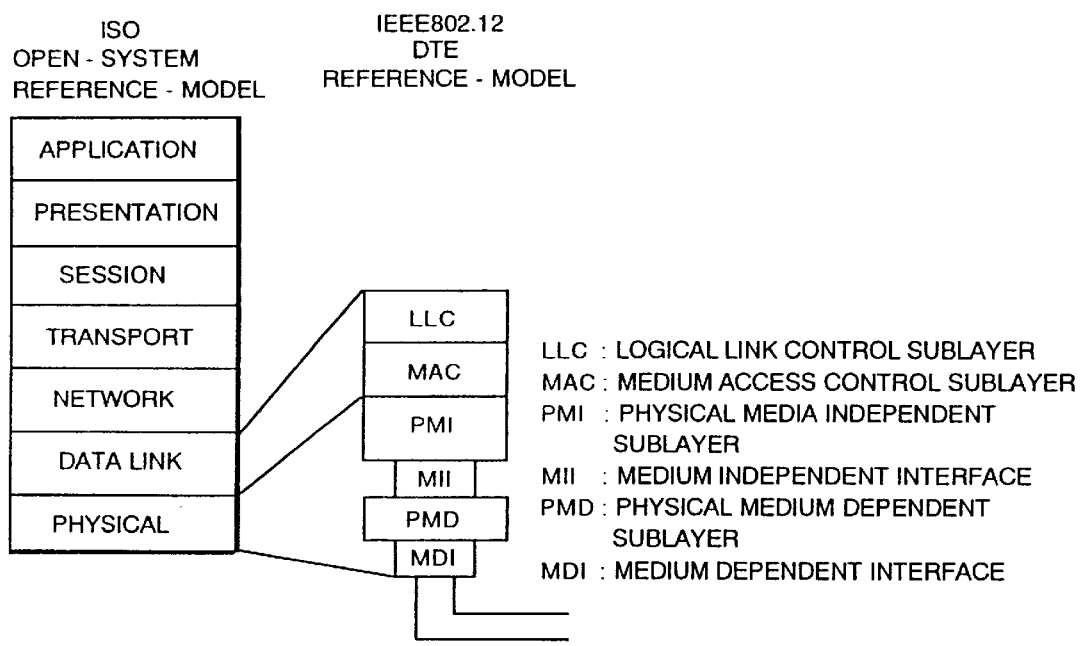
FIG. 21 is a drawing showing the correspondence between the protocol layer of the conventional demand priority system and the protocol layer of the ISO, OSI reference model.

FIG. 11 is similar to the conventional LAN system shown in FIG. 19 although the end nodes 250 are used and another end node device is connected to an end node in a daisy chain.

In the drawing, a numeral 210 indicates a hub and 200 and 250 end nodes. The hubs 210 and the end nodes 200 are the same as the conventional hub and end node 10 shown in FIG. 22 previously.

The operation of the end nodes 250 will be explained hereunder.

Firstly, the operation of the end nodes 250 having the constitution shown in FIG. 10 will be explained. The signal processor 1 shown in FIG. 9 executes the conversion and delay processing for receiving state signals 7a and 7b which are output from the PMD control units 2a and 2b and a sending state signal 8 which is output from the MAC/PMI control unit 3.

The operation will be explained in detail hereunder.

In FIG. 9, the output control signal selectors 92a and 92b select and transfer one of the receiving state signals 7a and 7b which are obtained by converting a tone signal from another node by the PMD control units 2a and 2b and the sending state signal 8 to the partner nodes which are connected to the PMD control units 2a and 2b respectively.

Namely, the output control signal selector 92a selects and transmits one of the receiving state signal 7b which is converted by the PMD control unit 2b and the sending state signal 8 to the PMD control unit 2a according to a combination of the receiving state signal 7b and the sending state signal 8. The output control signal selector 92b selects and transmits one of the receiving state signal 7a which is converted by the PMD control unit 2a and the sending state signal 8 to the PMD control unit 2b according to a combination of the receiving state signal 7a and the sending state signal 8.

This selection is executed according to Table 2. Table 2 shows the correspondence between a combination of the receiving state signal 7b and the sending state signal 8 and the signal which is selected by the output control signal selector 92a. For selection by the output control signal selector 92b, a table which is obtained by exchanging the PMD control unit 2a and the PMD control unit 2b shown in the table is used.

TABLE 2

| MAC | Input from PMD 2b | Input from PMD 2a |
| --- | --- | --- |
| Idle | Idle | Idle |
| Idle | Transfer request | Transfer request |
| Transfer request | — | Transfer request |
| Receivable | Transfer request/receivable | Transfer request/receivable |

As shown in Table 2, the output control signal selectors 92a and 92b select in the priority level of "transfer request">"Silence" when the receiving state signal 7a or 7b and the sending state signal 8 are a combination of different signals.

Next, the input control signal converter 91 generates a receiving state signal 93 for inducing the output of a suitable sending state signal 8 in the MAC/PMI control unit 3 according to a combination of the receiving state signals 7a and 7b from the PMD control units 2a and 2b and the sending state signal 8 from the MAC/PMI control unit 3 and outputs it to the MAC/PMI control unit 3.

Figure 12:
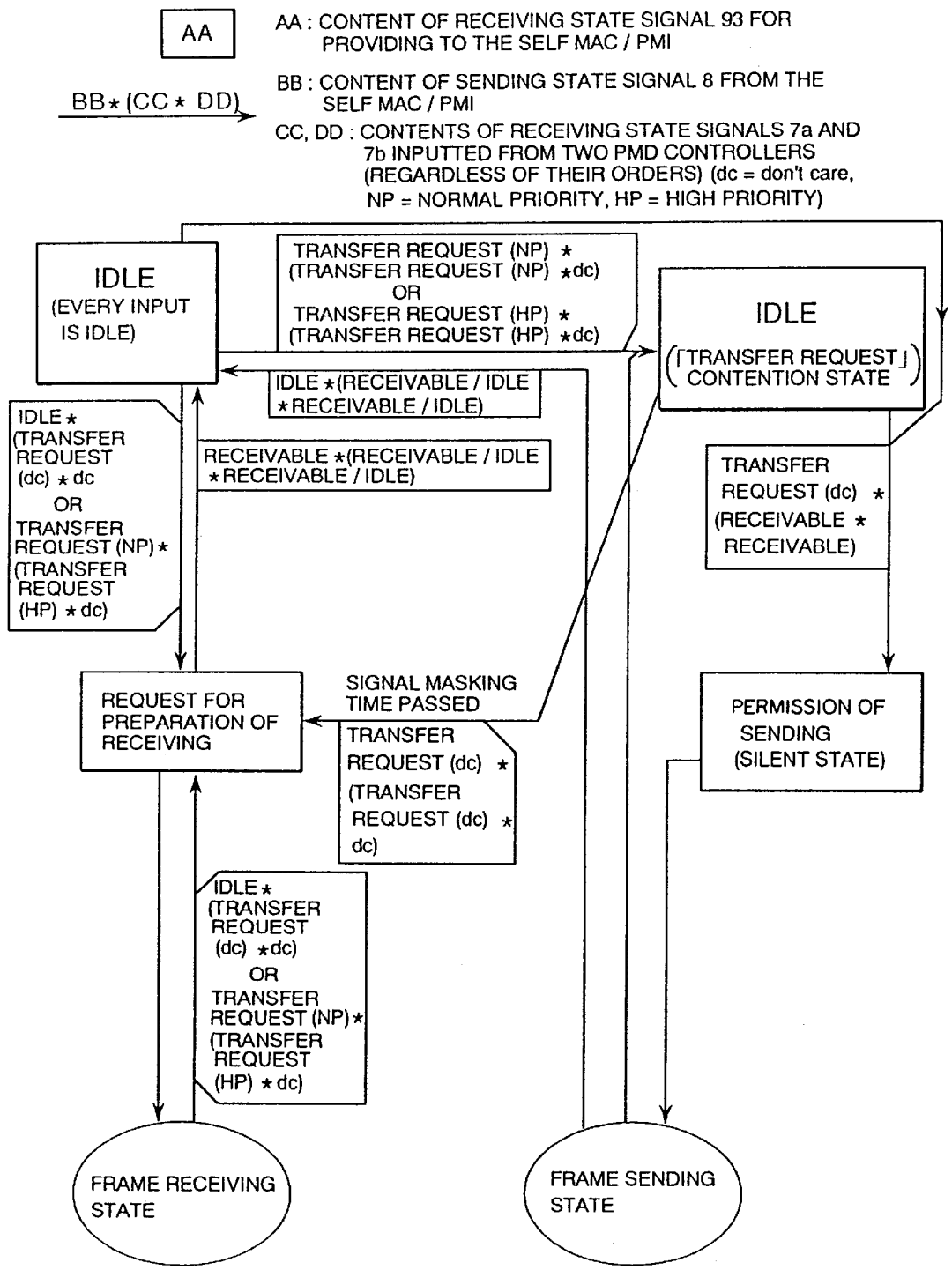
FIG. 12 is a state transfer diagram showing the operation of the control process unit of the second embodiment of the present invention.

Generation of the receiving stage signal 93 by the input control signal converter 91 is executed according to the state transfer diagram shown in FIG. 12.

Each state of the state transfer diagram shown in FIG. 12 indicates the content of the receiving state signal 93 which is output by the input control signal converter 91. Aside each arrow indicating state transfer, a combination of receiving state signals 7a and 7b and a sending state signal 8 which is a condition for transfer is shown.

Firstly, in the case "I" wherein the MAC/PMI control unit 3 does not output a "transfer request", when the signal processor 1 detects a "transfer request NP" or a "transfer request HP" from one of the PMD control units 2a and 2b, signal processor 1 generates a receiving state signal 93 indicating a "request for preparation of receiving" from the hub and transmits it to the MAC/PMI control unit 3.

On the other hand, when the MAC/PMI control unit 3 outputs a sending state signal 8 indicating a "transfer request NP" or a "transfer request HP", the receiving state signal 93 from the input control signal converter 91 indicates "Idle" at this time. In this state, the input control signal converter 91 changes the receiving state signal 93 from "Idle" in the following three cases.

The first case "II" is a case wherein both of receiving state signals from both of the PMD control units 2a and 2b are changed to "Silence" (silent state). In this case, the input control signal converter 91 changes the receiving state signal 93 to "Silence" (silent state) from the hub.

The second case "III" is a case wherein a "transfer request HP" which is higher in priority than a "transfer request NP" which is output from the MAC/PMI control unit 3 is output from at least one of the PMD control units 2a and 2b. In this case, the input control signal converter 91 changes the receiving state signal 93 to a "request for preparation of receiving" (silent state) from the hub.

The third case "IV" is a case wherein a "transfer request NP" on the same priority level as that of a "transfer request NP" which is output from the MAC/PMI control unit 3 is output from at least one of the PMD control units 2a and 2b or a "transfer request HP" on the same priority level as that of a "transfer request HP" which is output from the MAC/PMI control unit 3 is output from at least one of the PMD control units 2a and 2b.

In this case, the input control signal converter 91 sets the signal masking time using a signal masking time setting unit installed in the input control signal converter 91 which will be described later, inputs a receiving state signal indicating a "transfer request NP" or a "transfer request HP" from the PMD control units 2a and/or 2b, and then changes the receiving state signal 93 so as to indicate a "request for preparation of receiving" after the signal masking time elapses. However, when both of the receiving state signals from the PMD control units 2a and 2b are changed to "Silence" (silent state) before the signal masking time elapses, the input control signal converter 91 immediately changes the receiving state signal 93 in the "Idl" state to a receiving state signal indicating "Silence" (silent state) from the hub.

Next, the communication sequence between 3 end nodes 250 connected in a daisy chain which is realized by the operation in the third case will be explained.

Figure 13:
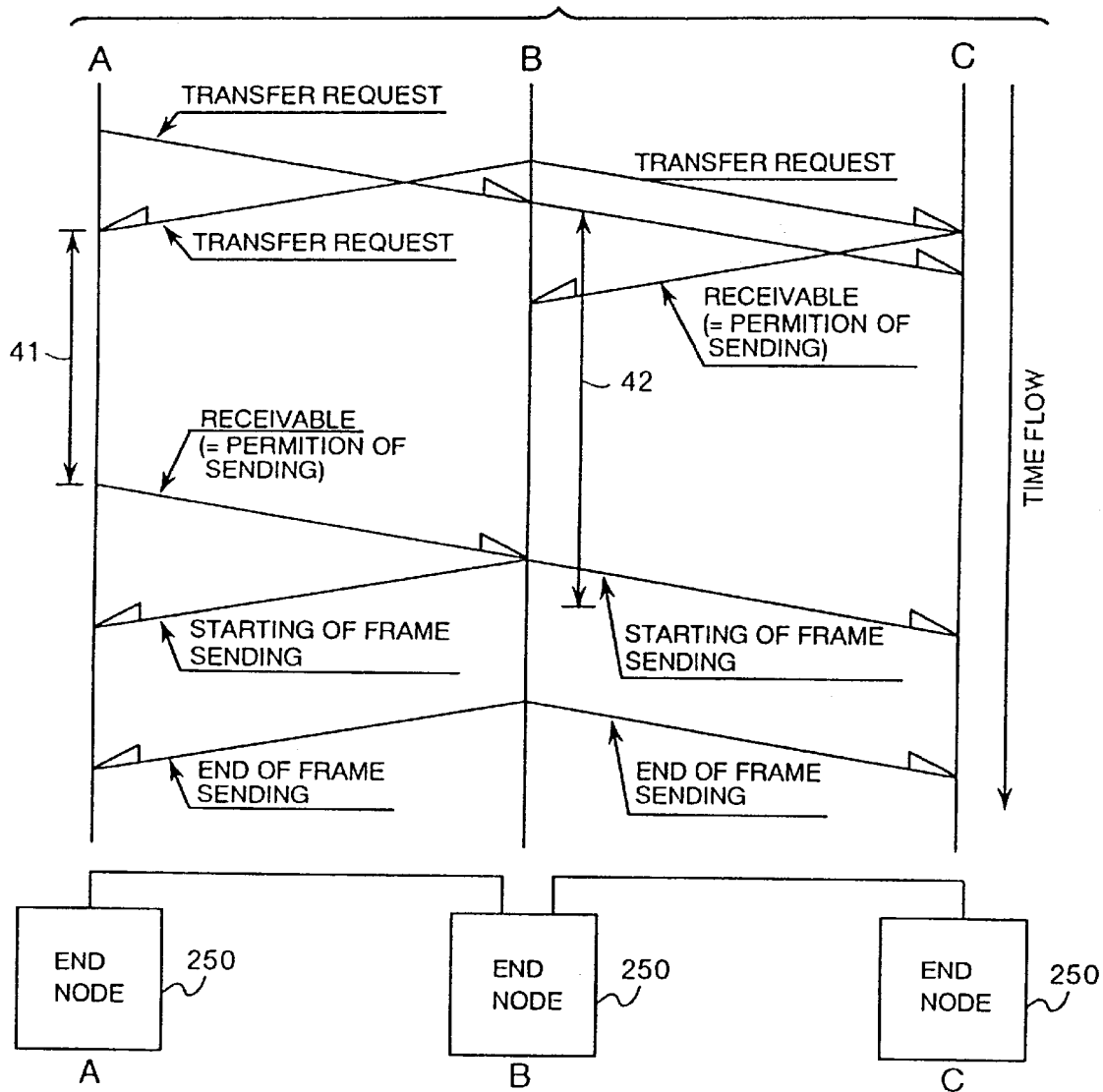
FIG. 13 is a drawing showing the communication sequence between nodes of the second embodiment of the present invention.

In FIG. 13, the "transfer requests NP" of the end nodes A and B conflict with each other. The LAN adapters of the conflicting devices set the signal masking times 41 and 42 respectively using the signal masking time setting unit installed in the input control signal converter 91.

On the other hand, the input control signal converter 91 of the end node C immediately changes the receiving state signal 93 so as to indicate a "request for preparation of receiving", and the MAC/PMI control unit 3 switches the output sending state signal 8 indicating "transfer request NP" to a sending state signal indicating "Silence" (silent state) and starts preparation of receiving, and the output control signal selectors 92a and 92b change the sending state signals 94a and 94b to "Silence".

The signal masking time 41 is set shorter than the signal masking time 42, so that the input control signal converter 91 of the end node A inputs a receiving state signal indicating "transfer request NP" from the PMD control unit and then changes the receiving state signal 93 so as to indicate "request for preparation of receiving" after the signal masking time 41 elapses. The MAC/PMI control unit 3 recognizes it and starts preparation of receiving.

The MAC/PMI control unit 3 of the end node A which inputs the receiving state signal indicating "request for preparation of receiving" switches the output sending state signal 8 indicating "transfer request 20 NP" to a sending state signal indicating "Silence" (silent state). In correspondence thereof, as mentioned above, the output control signal selectors change the sending state signals 94a and 94b to "Silence".

Since receiving state signals are all changed to "Silence" (silent state) before the signal masking time 42 elapses, the input control signal converter 91 of the end node B immediately changes the receiving state signal 93 in the "Idle" state to a receiving state signal indicating "Silence" (silent state) from the hub.

Therefore, among a plurality of nodes outputting a 150 conflicting "transfer request NP", a node which sets a longest signal masking time obtains the transfer right. In FIG. 13, the end node B obtains the transfer right. The MAC/PMI control unit 3 recognizes the transfer right and sends a frame to the end nodes A and C which are under preparation of receiving via the PMD control units 2a and 2b. The same may be said for the case wherein "transfer requests HP" conflict with each other.

By doing this, even when "transfer requests NP" or "transfer requests HP" conflict with each other among end nodes, the transfer right can be given only to one end node.

When "transfer requests NP" or "transfer requests HP" conflict with each other among end nodes, even by the operation in the aforementioned third case, by the effects of the circuit of the signal processor 90 and of signal delay of the transmission cable, the timing for switching the sending state signal 8 indicating "transfer request NP" or "transfer request HP" which is output from the MAC/PMI control unit 3 to a sending state signal indicating "Silence" (silent state) may coincide with the timing that the receiving 5 state signals 7a and 7b are changed to "Silence" (silent state).

Therefore, for such a case, when the input control signal converter 91 detects "Silence" of all inputs, it switches the receiving state signal 93 to the "Idle" state. By this processing, the MAC/PMI control unit 3 outputs a "transfer request NP" or a "transfer request HP" again.

Furthermore, in the frame receiving state and frame sending state shown in FIG. 12, frame data is distributed. In the frame receiving state, the signal processor 1 transmits a frame which is input from the PMD control unit 2a or 2b which outputs "Silence" (silent state) to the MAC/PMI control unit 3 and sends it to the other PMD control unit at the same time.

In this case, the signal processor 1 outputs nothing to the PMD control unit which outputs "Silence" (silent state). The MAC/PMI control unit 3 transfers the received frame to the data processor 22 via the interface 4. The data processor checks the address of the transferred frame. When the transferred frame is addressed to the data processor, the unit fetches it; when it is not, the unit abolishes the frame.

In the frame sending state, the frame which is sent from the data processor 22 via the interface 4 is sent 5 to both of the PMD control units 2a and 2b from the MAC/PMI control unit 3.

In the above operation, the output control signal output units 92a and 92b of the end node at the end of the end nodes connected in a daisy chain always selects a sending state signal from the MAC/PMI control unit 3 of the self node and the input control signal converter 91 does not use the value of a receiving state signal from the PMD control unit 2a or 2b which is not connected to the other end nodes under the transfer condition shown in FIG. 12. Namely, it transfers the state according to the state transfer diagram shown in FIG. 18.

Next, the signal masking time setting unit in the input control signal converter 91 mentioned above will be explained.

To improve the effective transmission rate of the whole network (amount of effective data which can be transmitted within a certain time) in the aforementioned signal masking time setting unit, it is necessary to minimize the probability of occurrence of silent state of all the nodes and the probability of continuous occurrence of the aforementioned state.

Figure 14:
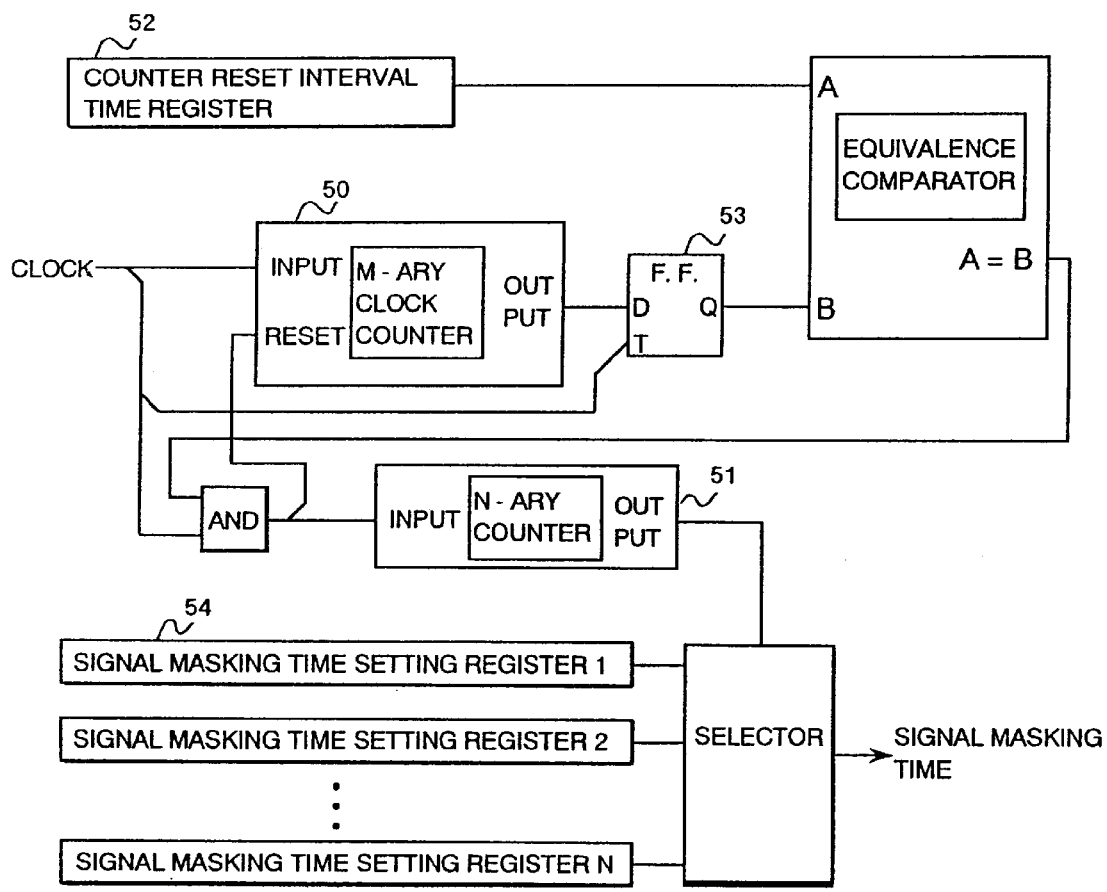
FIG. 14 is a block diagram indicating the constitution of the signal masking time setting unit of the second embodiment of the present invention.

FIG. 14 shows the constitution of the signal masking time setting unit.

As shown in the drawing, the signal masking time setting unit consists of two sets of counters. An m-ary clock counter 50 specifies the counting-up time interval of an n-ary counter 51. Symbols m and n are integers and decided at the time of circuit design.

The n-ary counter 51 counts up by one each time the output value of the m-ary counter 50 becomes 0. Since the m-ary counter 50 is reset when the output value becomes equal to the value of a register 52 which is externally installed, it adjusts the counting-up time interval of the n-ary counter 51 within the range of m stages.

The signal masking time is selected from the n stages of setting times in the input control signal converter 91 on the basis of the output value of the n-ary counter 51 at the point of time when the aforementioned conflict of "transfer request NP"or "transfer request HP" is ascertained.

Specifically, in an example that two 2-port LAN adapters 96 using the aforementioned signal processor which is designed assuming that m and n are 8 respectively are used, the probability that both of the adapters become "Silence" (silent state) at the same timing when a conflict occurs and the probability of continuous occurrence of the aforementioned state are calculated.

Figure 15:
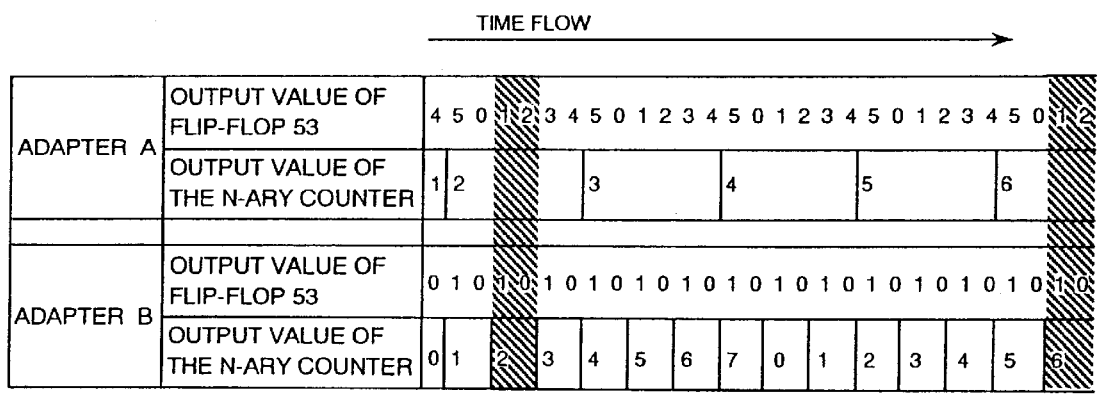
FIG. 15 is a drawing showing an operation example of the signal masking time setting unit of the second embodiment of the present invention.

Assuming that the set values of the aforementioned registers 52 in both of the adapters are 1 and 5 respectively, each of the signal masking times is switched as shown in FIG. 15. Since the clock in each adapter is independent, the lag of start timing of the counter 51 is not constant.

When this start timing lag is taken into account, the expected value of probability that both of them become "Silence" (silent state) at the same timing when a conflict occurs is 12.5%. Furthermore, the expected value of probability of continuous occurrence of the aforementioned state is 1.56%.

When the value of m is designed as a large value beforehand, even when a plurality of adapters are used, it is possible to increase the number of combinations of values which are set to each register 52 and to select a combination so that the probability that the signal masking times coincide with each other is lowered.

In the above explanation, the n stages of set values for the signal masking time setting registers 1 to n are made equal in each LAN adapter. However, the priority for obtaining the transfer right among the LAN adapters may be set by biasing the set values of n signal masking time setting registers 54 in each LAN adapter toward the relatively shorter or longer side.

As mentioned above, by the operation of the signal processor 90, direct communication between the end nodes is made possible using the 2-port LAN adapter 96 shown in FIG. 9 but not via the hub. Next, the operation of the end nodes 250 in the constitution shown in FIG. 11 will be explained.

The operation of the end nodes 250 in this case is almost the same as the operation in the constitution shown in FIG. 10 and the operation of the whole LAN system is also almost the same as that of the conventional LAN system, though the following aspects are different.

The first aspect is that the downstream port of the hub to which the end nodes 250 are connected are set in the promise cure mode. This can be realized by providing that the signal processor 1 of the end node 250 which is directly connected to the hub corresponds so that the respective end node is acknowledged as a hub by the connection check by the hub at the time of start of the network. By doing this, all frames are sent to this end node 250 from the downstream port of the upstream hub which is set in the promise cure mode.

The second aspect is that the output control signal selector and input control signal converter of the signal process unit 1 of the end node which is directly connected to the hub convert all "requests for preparation of receiving" from the hub to a receiving state signal indicating "transfer request HP" of high priority and then execute the aforementioned processing. Further, the output control signal selector of the signal process unit 1 of the end node which is connected to the hub via another end node converts a "transfer request HP" of high priority which is output from the MAC/PMI control unit 3 to a "transfer request NP" of normal priority and then executes the aforementioned processing. By doing this, a "request for preparation of receiving" from the hub is always given high priority, so that the signal processor 1 can return a response of "Silence" within the time specified via the hub.

Designation of the PMD control unit 2a connected to the hub or setting of whether or not it is connected to the hub via another end node is set in the signal processor 1, for example, by a manual switch. It may also be set by an instruction from the data processor 22 or by the decision procedure shown in FIG. 4 which is explained in the aforementioned first embodiment.

As explained above, according to this second embodiment, a plurality of end nodes connected in a daisy chain configuration can be incorporated into a star type LAN having a standard hub by using a 2-port LAN adapter having the signal processor 1. A plurality of end nodes can be directly connected to each other in a daisy chain configuration. When only one port of the 2-port LAN adapter is used and the output control signal selector corresponding to this port and the input control signal converter always output a receiving state signal and a sending state signal transmissibly, this end node can be connected independently to a star type LAN in the same way as with a conventional end node.

The third embodiment of the present invention will be explained hereunder.

Figure 16:
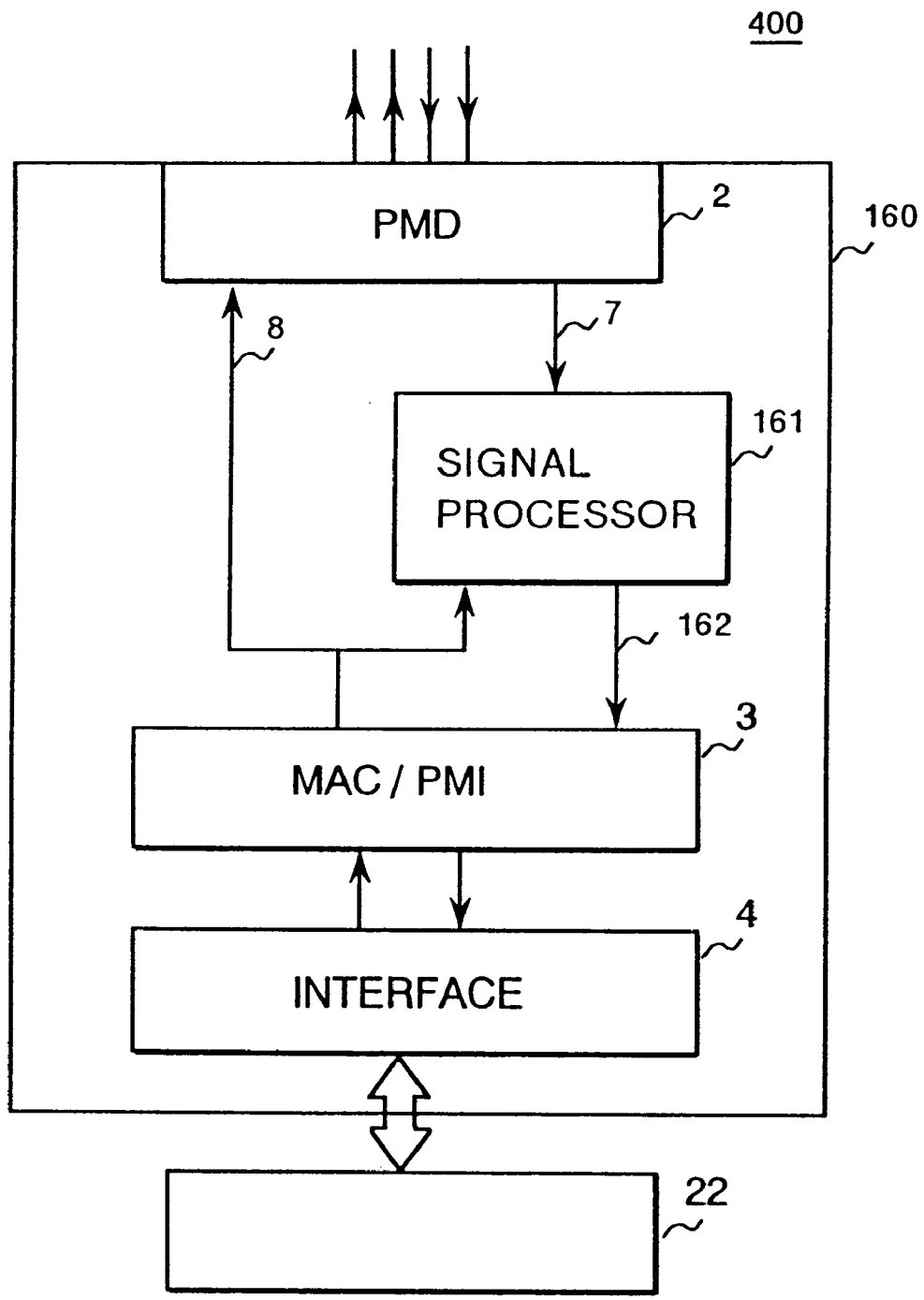
FIG. 16 is a block diagram showing the constitution of the end node of the third embodiment of the present invention.

FIG. 16 is the constitution of the end node of this third embodiment of the present invention.

As shown in the drawing, in an end node 400 of this third embodiment, a signal processor 161 for executing the conversion and delay processing for a receiving state signal and a sending state signal between the PMD control unit 2 and the MAC/PMI control unit 3 is installed in a LAN adapter 300 in the same way as with the second embodiment.

Figure 17:
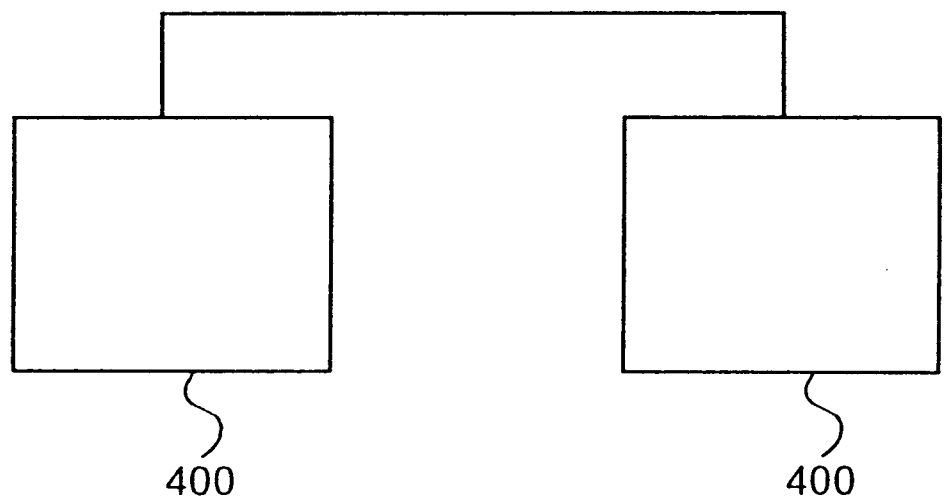
FIG. 17 is a drawing showing a connection example of the end node of the third embodiment of the present invention.

In this third embodiment, connection between one 5 to-one end nodes 400 as shown in FIG. 17 using the end node 400 shown in FIG. 16 and connection between an end node 400 and a hub in the conventional way can be realized.

Firstly, the operation of the end nodes which are connected in a one-to-one correspondence as shown in FIG. 17 will be explained.

The signal processor 161 of this third embodiment does not have the output control signal selectors 92a and 92b shown in the second embodiment mentioned above but has only the input control signal converter.

Figure 18:
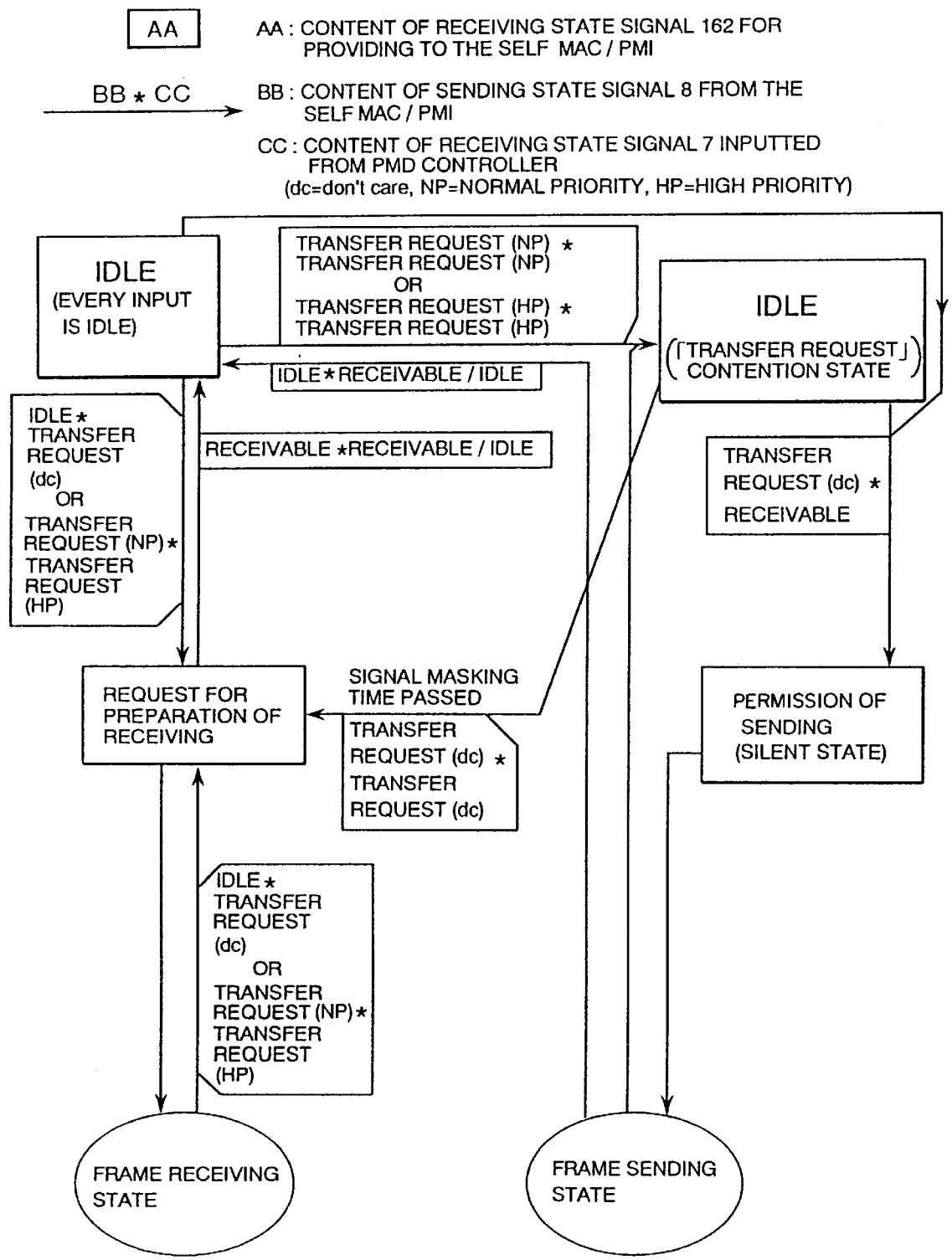
FIG. 18 is a state transfer diagram showing the operation of the control process unit of the third embodiment of the present invention.

In this third embodiment, the input control signal converter changes a receiving state signal according to the state transfer diagram shown in FIG. 18 and transmits it to the MAC/PMI control unit 3.

Namely, when the MAC/PMI control unit 3 does not output a "transfer request N'" or a "transfer request HP" and the input control signal converter detects a "transfer request NP" or a "transfer request HP" from the PMD control unit 2, it generates a receiving state signal indicating a "request for preparation of receiving" from the hub and transmits it to the MAC/PMI control unit 3.

On the other hand, when the MAC/PMI control unit 3 outputs a tone source signal 15 indicating "transfer request NP" or "transfer request HP", the receiving state signal 162 from the input control signal converter indicates "Idle" at this point of time. In this state, the input control signal converter changes the receiving state signal 162 from "Idle" in the following three cases.

The first case is a case wherein both of the receiving state signals from the PMD control units 2 are changed to "Silence" (silent state). In this case, the input control signal converter changes the receiving state signal 162 to "Silence." (silent state) from the hub.

The second case is a case wherein a "transfer request HP" which is higher in priority than a "transfer request NP" which is output from the MAC/PMI control unit 3 is output from the PMD control unit 2. In this case, the input control signal converter changes the receiving state signal 162 to a "request for preparation of receiving" (silent state) from the hub.

The third case is a case wherein a "transfer request NP" or a "transfer request HP" on the same priority level as that of a "transfer request NP" or a transfer request HP" which is outputted from the MAC/PMI control unit 3 is outputted from the PMD control units 2.

In this case, the input control signal converter sets the signal masking time using the signal masking time setting unit installed in the input control signal converter which is described above, inputs a receiving state signal indicating a "transfer request NP" or a "transfer request HP" from the PMD control unit 2, and then changes the receiving state signal 162 so as to indicate a "request for preparation of receiving" after the signal masking time elapses. However, when the receiving state signal from the PMD control unit 2 is changed to "Silence" (silent state) before the signal masking time elapses, the input control signal converter immediately changes the receiving state signal 162 in the "Idle" state to a receiving state signal indicating "Silence" (silent state) from the hub.

By doing this, as described above, even when a conflict occurs between the end nodes, the transfer right can be given only to one end node.

For the aforementioned reason, when the input control signal converter detects "Silence" of all inputs, it switches the receiving state signal 162 to the "Idle" state. By this processing, the MAC/PMI control unit 3 outputs a "transfer request" again.

Furthermore, in the frame receiving state and frame sending state shown in FIG. 18, frame data is sent or received.

Namely, in the frame receiving state, the input control signal converter transmits a frame which is input from the PMD control unit 2 which outputs "Silence" (silent state) to the MAC/PMI control unit. The MAC/PMI control unit 3 transfers the received frame to the data processor 301 via the interface 4. The data processor checks the address of the transferred frame. When the transferred frame is addressed to the data processor, the unit fetches it. When it is not, the unit abolishes it. In the frame sending state, the frame which is sent from the data processor 301 via the interface 4 is sent to the PMD control unit 2 from the MAC/PMI control unit 3.

By the above operation, the one-to-one connection shown in FIG. 17 can be realized.

When the signal processor 161 transmits a receiving state signal 7 from the PMD control unit 2 to the MAC/PMI control unit 3 as a receiving state signal 162 unless it is processed, it can be connected to the hub in the same way as with a conventional end node. Designation of one-to-one connection or connection to the hub is set in the signal processor 1 by a manual switch. It may be set by an instruction 5 from the data processor 301.

The end node shown in this third embodiment may be used as an end node at the end (end node using only one port) of a plurality of end nodes connected in a daisy chain configuration shown in the second embodiment mentioned 10 above.

As mentioned above, according to the present invention, direct communication between end nodes which are sent and received under control of a hub and between upstream ports of the hub can be made 15 possible.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

We claim:

1. An inter-device connection apparatus connecting a send/receive partner apparatus via a transmission medium, comprising:
    a connection unit connected to said transmission medium;
    a port unit for controlling a signal sent or received between said send/receive partner apparatus via said connection unit,
    wherein in case said connection unit is connected with said send/receive partner apparatus via said transmission medium, said port unit works as a downlink port so that said inter-device connection apparatus operates as an upstream apparatus to said send/receive partner apparatus, when said send/receive partner apparatus is set to work as a downstream apparatus to said inter-device connection apparatus, and said port unit works as an uplink port so that said inter-device connection apparatus operates as a downstream apparatus to said send/receive partner apparatus, when said send/receive partner apparatus is set to work as an upstream apparatus to said self inter-device connection apparatus.

2. An inter-device connection apparatus according to claim 1, wherein said port unit judges that said send/receive partner apparatus is set to work as an upstream apparatus to said inter-device connection apparatus, in accordance with a content of a control signal sent from said send/receive partner apparatus via said connection unit, in case said connection unit is connected with said send/receive partner apparatus via said transmission medium.

3. An inter-device connection apparatus according to claim 2, wherein said port unit receives a control signal indicating a transfer request sent from said send/receive partner apparatus via said connection unit, as a downlink port decided as a result of the judgement and said port unit decides a preferential transfer request in accordance with a predetermined control process, when a conflict occurs between a transfer request generated in said inter-device connection apparatus, and said control signal indicating a transfer request sent from said send/receive partner apparatus.

4. An inter-device connection apparatus according to claim 2, wherein said port unit has a plurality of states circulatively transferring and holding a predetermined relation between said port unit and said send/receive partner apparatus, and when said send/receive partner apparatus is not in the state of sending said control signal indicating a transfer request, said port unit controls to send said control signal indicating the transfer request via said connection unit.

5. An inter-device connection apparatus according to claim 3, wherein said port unit performs control so that the control signal indicating that the decided preferential transfer request is executed first, is sent to said send/receive partner apparatus via said connection unit.

6. An inter-device connection apparatus according to claim 5, wherein said port unit sends a control signal indicating a transfer request, to said send/receive partner apparatus, as an uplink port decided as a result of the judgement, and said port unit performs control to receive a control signal indicating a transfer permission, from said send/receive partner apparatus.

7. An inter-device connection apparatus according to claim 1, wherein said L port unit judges that said send/receive partner apparatus is set to work as a downstream apparatus to said inter-device connection apparatus, in accordance with a content of a control signal sent from said send/receive partner apparatus via said connection unit, in case said connection unit is connected with said send/receive partner apparatus via said transmission medium.

8. An inter-device connection apparatus according to claim 1, wherein said port unit is set as either one of said uplink port or said downlink port, in accordance with a content of a control signal sent from said send/receive partner apparatus via said connection unit.

9. An inter-device connection apparatus according to claim 1, wherein said port unit works as said uplink port so that said inter-device connection apparatus operates as a downstream apparatus to said send/receive partner apparatus, when said send/receive partner apparatus is a line concentrator.

10. A port unit control method for executing in an inter-device connection apparatus having at least one port unit connected to another port unit in a send/receive partner apparatus via at least a transmission medium, said method comprising:
    a step of judging whether said send/receive partner apparatus is set to work as a downstream apparatus to said inter-device connection apparatus, or said send/receive partner apparatus is set to work as an upstream apparatus to said inter-device connection apparatus, when said at least one port unit is connected to said another port unit via said at least a transmission medium;
    a step performed by said inter-device connection apparatus, of operating as an upstream apparatus to said send/receive partner apparatus, when said send/receive partner apparatus is set to work as a downstream apparatus to said inter-device connection apparatus; and
    a step performed by said inter-device connection apparatus, of operating as a downstream apparatus to said send/receive partner apparatus, when said send/receive partner apparatus is set to work as an upstream apparatus to $aid inter-device connection apparatus.

11. A port unit control method according to claim 10, wherein said step of judging judges in accordance with a content of a control signal sent from said send/receive partner apparatus.

12. A port unit control method according to claim 10, wherein said step performed by said inter-device connection apparatus, of operating as an upstream apparatus, comprises:
   a step of setting said at least one port unit as a downlink port sending or receiving a signal between said send/receive partner apparatus via said at least a transmission medium.

13. A port unit control method according to claim 12, further comprising:
   a step of receiving after the setting of said at least one port unit as a downlink port, a control signal indicating a transfer request sent from said send/receive partner apparatus;
   a step of deciding a preferential transfer request in accordance with a predetermined control process, when a conflict occurs between a transfer request generated in said inter-device connection apparatus and said control signal indicating a transfer request received from said send/receive partner apparatus; and
   a step of sending a control signal to said send/receive partner apparatus via said transmission medium in accordance with the judging step.

14. A port unit control method according to claim 12, wherein said downlink port has a plurality of states circulatively transferring and holding a predetermined relation between said downlink port and said send/receive partner apparatus, and comprises:
   a step performed by said downlink port of sending a control signal indicating a transfer request, when said send/receive partner apparatus is not in the state of sending said control signal indicating a transfer request.

15. A port unit control method according to claim 10, wherein said step performed by said inter-device connection apparatus, of operating as a downstream apparatus, comprises:
   a step of setting said at least one port unit as an uplink port sending or receiving a signal between said send/receive partner apparatus via said transmission medium.

16. A port unit control method according to claim 15, further comprising;
   a step of receiving after the setting of said one port unit as said uplink port, a control signal indicating a transfer request to said send/receive partner apparatus;
   a step of receiving a control signal indicating a transfer permission, from said send/receive partner apparatus.

17. A port unit control method according to claim 10, further comprising:
   a step performed by said at least one port unit, of setting itself as either one of a downlink port sending or receiving a signal to said down stream apparatus via said transmission medium, or an uplink port sending or receiving a signal to said upstream apparatus via said transmission medium, in accordance with either one of said step of operating as an upstream apparatus or said step of operating as a downstream apparatus, after said either one of said step of operating as an upstream apparatus or said step of operating as a downstream apparatus.

18. A port unit control method according to claim 10, wherein said inter-device connection apparatus works as an uplink port after said step of judging, said uplink port sending or receiving signal between said send/receive partner apparatus via said transmission medium, so that said inter-device connection apparatus operates as a downstream apparatus to said send/receive partner apparatus, when said send/receive partner apparatus is a line concentrator.

* * * * *